US009857480B1

(12) United States Patent
Warburton et al.

(10) Patent No.: US 9,857,480 B1
(45) Date of Patent: Jan. 2, 2018

(54) METHOD AND APPARATUS FOR DETECTING DILUTE CONCENTRATIONS OF RADIOACTIVE XENON IN SAMPLES OF XENON EXTRACTED FROM THE ATMOSPHERE

(71) Applicant: XIA LLC, Hayward, CA (US)

(72) Inventors: William K. Warburton, Oakland, CA (US); Wolfgang G. Hennig, Fremont, CA (US)

(73) Assignee: XIA LLC, Hayward, CA (US)

( * ) Notice: Subject to any disclaimer, the term of this patent is extended or adjusted under 35 U.S.C. 154(b) by 24 days.

(21) Appl. No.: 15/094,793

(22) Filed: Apr. 8, 2016

Related U.S. Application Data

(60) Provisional application No. 62/145,393, filed on Apr. 9, 2015.

(51) Int. Cl.
  *G01T 1/17*  (2006.01)
  *G01T 1/178* (2006.01)
  *G01T 1/20*  (2006.01)
  *G01T 1/208* (2006.01)

(52) U.S. Cl.
  CPC .............. *G01T 1/178* (2013.01); *G01T 1/208* (2013.01); *G01T 1/2018* (2013.01)

(58) Field of Classification Search
  CPC ................................ G01T 1/172; G01T 1/178
  See application file for complete search history.

(56) References Cited

PUBLICATIONS

McIntyre et al., "Measurements of Ambient Radioxenon Levels Using the Automated Radioxenon Sampler/Analyzer (ARSA)", Journal of Radioanalytical and Nuclear Chemistry, vol. 248, No. 3 (2001) 629-635.*
Biegalski et al., "Deconvolution of Three-Dimensional Beta-Gamma Coincidence Spectra From Xenon Sampling and Measurement Units", Journal of Radioanalytical and Nuclear Chemistry, vol. 263, No. 1 (2005) 259-265.*

* cited by examiner

*Primary Examiner* — Casey Bryant
(74) *Attorney, Agent, or Firm* — Kilpatrick Townsend & Stockton LLP

(57) ABSTRACT

A method and apparatus for measuring the concentrations of radioxenon isotopes in a gaseous sample wherein the sample cell is surrounded by N sub-detectors that are sensitive to both electrons and to photons from radioxenon decays. Signal processing electronics are provided that can detect events within the sub-detectors, measure their energies, determine whether they arise from electrons or photons, and detect coincidences between events within the same or different sub-detectors. The energies of detected two or three event coincidences are recorded as points in associated two or three-dimensional histograms. Counts within regions of interest in the histograms are then used to compute estimates of the radioxenon isotope concentrations. The method achieves lower backgrounds and lower minimum detectable concentrations by using smaller detector crystals, eliminating interference between double and triple coincidence decay branches, and segregating double coincidences within the same sub-detector from those occurring between different sub-detectors.

26 Claims, 11 Drawing Sheets

METHOD AND APPARATUS FOR DETECTING DILUTE CONCENTRATIONS OF RADIOACTIVE XENON IN SAMPLES OF XENON EXTRACTED FROM THE ATMOSPHERE

CROSS-REFERENCE TO RELATED APPLICATION

This application claims the benefit of U.S. Patent Application No. 62/145,393, filed Apr. 9, 2015, for "Method and Apparatus for Detecting Dilute Concentrations of Radioactive Xenon in Samples of Xenon Extracted From the Atmosphere" (inventors William K. Warburton and Wolfgang G. Hennig), the entire disclosure of which is hereby incorporated by reference for all purposes.

STATEMENT AS TO RIGHTS TO INVENTIONS MADE UNDER FEDERALLY SPONSORED RESEARCH OR DEVELOPMENT

The U.S. Government has rights in this invention pursuant to Contract No. DE-SC0011301 awarded by the Department of Energy.

TABLE OF CONTENTS

Statement as to Rights to Inventions Made Under Federally Sponsored Research or Development
Cross-Reference to Related Application
BACKGROUND OF THE INVENTION
  Field of the Invention
  A Synopsis of Current Prior Art
    The ARSA detector
    The SAUNA detector
    The PNNL improved detector
    The PhosWatch detector
    Issues for next generation radioxenon detectors
    Limitations on existing beta-gamma detectors
    Beta-gamma detectors using semiconductor detectors
    Conclusions and requirements for an improved beta-gamma radioxenon detector
Summary of the Invention
Brief Description of the Drawings
Description of Specific Embodiments
  1. The principle of geometrical partitioning
  2. Background measurements
    2.1 Detector configuration
    2.2 Double coincidence backgrounds
    2.3 Triple coincidence backgrounds
  3. Estimated detection limits
  4. Reduction of interferences
  5. Preferred embodiment with N equal to
  6. Preferred embodiment with N equal to
  7. Using a scintillator as the optical coupler
  8. Operation as a complete detector system
  9. Additional detector system embodiments
  10. References
  11. Conclusion
Abstract of the Disclosure

BACKGROUND OF THE INVENTION

Field of the Invention

The present invention relates generally to systems for detecting very low levels of radioactive xenon isotopes (also "xenon radioisotopes," or simply "radioxenon") in samples of xenon extracted from the atmosphere and, in particular, to detectors for this purpose of the type commonly referred to by those skilled in the art as "beta/gamma" detectors.

A Synopsis of Current Prior Art

The United States has an active interest in detecting and monitoring nuclear explosions to ensure the compliance of foreign countries with several treaties limiting or banning nuclear test explosions, to detect clandestine tests of nations with undeclared nuclear weapons programs, and to confirm claims of nuclear weapons tests by nations such as North Korea. As no single technology can reliably detect a nuclear device test under all circumstances, the Air Force Technical Applications Center operates a network of very different detection systems, including seismic, acoustic and radionuclide detectors. Simultaneously, the International Monitoring System (IMS) is being established to monitor compliance with the Comprehensive Nuclear-Test-Ban Treaty (CTBT), when it comes into force. Even without the CTBT being in force, the data provided by the IMS are highly valuable to the national security of its supporters (as has been dramatically shown by North Korea's recent tests), and the U.S. cooperates closely on the IMS even though it has not yet ratified the CTBT.

When complete, the IMS will comprise 170 seismic, 11 hydroacoustic, 60 infrasound and 80 Radionuclide (RN) stations. Of the RN stations, 40 are currently scheduled to be equipped with radioxenon detectors and there are serious ongoing discussions about whether to similarly equip the remaining 40. While every nuclear explosion creates a detectable seismic signal, the interpretation of these signals is sometimes ambiguous and the coincident detection of fission products is used to provide a more robust confirmation that the explosion was nuclear. Of the various fission products, only the xenon isotopes—inert noble gases that can seep through rocks—are likely to be released in detectable quantities even from nuclear explosions conducted deep underground.

Four of these, $^{135g}$Xe, $^{133m}$Xe, $^{133g}$Xe, and $^{131m}$Xe, with half lives of 9.1 hours, 2.2 days, 5.3 days and 11.9 days, respectively, are sufficiently long-lived to be detectable at an RN station far away and a few days later. To compensate for atmospheric dilution between the origin and detection sites, the RN stations all extract xenon from 10-20 $m^3$ of air and then measure its radioactivity in extremely low background counters. The IMS detection limit requirement for the detectors is 1 mBq/$m^3$, meaning 1 count/1000 sec from the xenon collected from 1 cubic meter of air. As the xenon is usually extracted from 10 $m^3$ of air, this gives a count rate of 1 count per 100 sec, or about 3.6 counts/hour, which is much below a typical nuclear counter's background rate in a well shielded environment.

Many of the radioxenon detectors employed in the IMS address this problem by using the fact that all of the radioxenon isotopes of interest decay by emitting an energetic electron (either a beta particle (β) or a conversion electron (CE) in coincidence with a photon (either a gamma-ray (γ) or an x-ray). By requiring the detection of an electron of appropriate energy in coincidence with a photon of appropriate energy before a count is registered, these electron/photon (colloquially "beta/gamma") detectors lower their background counting rates by factors of 100 to 1000 and are able to detect the radioxenon isotopes at the desired low concentrations.

The ARSA detector

One of the first beta/gamma detectors specifically for this purpose was developed at Pacific Northwest National Laboratory (PNNL) in the late 1990's. [REEDER—1998, MCINTYRE—2001, MCINTYRE—2004, REEDER—2004, RYNES—2004]. Dubbed ARSA (for Automated Radioxenon Sampler-Analyzer), its operating principle may be understood by reference to FIG. 1. The detector comprises 4 cylindrical cells 1, made of the scintillator plastic BC404, that hold samples of xenon to be analyzed. The end of each cell connects to a photomultiplier (PMT) 2, so that each cell is viewed by 2 PMTs. These assemblies are coated with a light-tight layer 5 and embedded at the interface between a pair of blocks of the crystal scintillator NaI(Tl) 7 that are also optically isolated 5 from each other. Each block of NaI(Tl) 7 is viewed by 2 PMTs 8.

Next, consider the simple decay of the radioxenon isotope $^{133m}$Xe, which decays from the metastable state to the ground state by electron conversion (CE), emitting an energetic electron with 199 keV energy. The captured electron is usually from the atom's K shell (63% of the time) and the resultant hole is filled by an L shell electron, resulting in the emission of a Xe-K x-ray (46% of the time) with 29 keV of energy. Thus, 46% of the time, the decay produces an energetic CE and an x-ray in coincidence. In the ARSA detector, the CE is absorbed in the BC404 cell 1, emitting light that is then collected by the PMTs 2, resulting in an output electrical pulse that is then detected and analyzed by an attached spectrometer, as is well understood by those skilled in the art. The x-ray passes through the BC404 and is absorbed in the NaI(Tl) scintillator 7, producing light that is detected by the PMTs 8, and is similarly detected and analyzed by an attached spectrometer. The attached spectrometer is configured to only record events when it detects a signal from the BC404 PMTs in coincidence with a signal from the NaI(Tl) PMTs, where "coincidence" is defined as the two signals arriving within a predetermined time window, typically 50-100 ns. Each time a coincidence is recorded, the spectrometer records the pair of detected energies (e.g., [photon energy|electron energy]) to its memory.

To analyze the sample for the presence of the radioxenon, the resultant [photon energy electron energy] pairs are sorted into a 2-D histogram of photon ("gamma") energy versus electron ("beta") energy. Histograms characteristic of the 4 isotopes are shown in FIG. 2. [MCINTYRE—2001, REEDER—2004, AXELSSON—2012, COOPER—2012]. These figures, which were collected from nominally pure samples of the isotopes, show features that are characteristic of their decay processes. Region of interest (ROI) boxes can then be drawn on the histograms to capture counts characteristic of the different isotopes' decays. These are shown as the boxes 11-17 in FIG. 2.

In particular, in the figure labeled $^{133m}$Xe, the box 14 from 18.5 to 50 keV photon energy and from 160 to 239 keV electron energy is sensitive to the [30 keV x-ray|199 keV CE] emission from $^{133m}$Xe discussed above. The box dimensions are determined by both the detector's energy resolution and the energy to be detected. Considering box 14, for example, the NaI(Tl) detector has energy resolution of about 20% FWHM at 30 keV, so the box is set at 2 times FWHM from 18.5 keV to 50 keV. Similar considerations lead to the box dimensions for the electron energy detected by the BC404 scintillator.

In the figure labeled $^{133g}$Xe, box 11 is set for the $^{133g}$Xe decay consisting of a beta particle with an endpoint energy of 346 keV (99% of the time) followed by a gamma-ray of 81 keV (37% of the time). Since beta particles can have any energy up to their end-point energy, the ROI box for this decay is quite large, going from 23.5-368 keV in electron energy and 61-106 keV in photon energy. The low end of the ROI is not set by the lower range of the beta particles, but instead by the detector's noise floor.

Since the histograms in FIG. 2 are from relatively pure samples, the counts lying in the areas between the boxes arise from secondary processes, typically photon scattering, wherein the photon does not deposit its full energy in the NaI(Tl) detector, but instead scatters out of it back into the BC404. Since the intensity scale in FIG. 2 is logarithmic, it is clear that such processes constitute only a relatively small fraction of all events. Each of the boxes 11-17 is similarly sensitive to some particular pair of decay products that will identify one of the four radioxenon isotopes or, in the case of box 17, provide a background counting rate estimate.

The detection limit of the ARSA detector, which is the lowest concentration of a radioxenon isotope it can detect that is statistically significant, is determined by both its efficiency in capturing the isotopes' decay products and by the number of background events that fall into the ROI boxes. [MCINTYRE—2006]. If, for a well characterized counter, we know that the background counting rate into a particular ROI is b counts/sec, then, if after t seconds of counting, we have collected N counts, we can infer that we collected S signal counts at a rate of s, where $$S=N-b\times t\pm\sqrt{N}. \tag{1}$$

Further, if we require the measurement at the 2 sigma (2σ) confidence level, i.e., S≥2√N, the minimum detectable signal counting rate $s_{min}$ is given by $$s_{min}T=2\sqrt{N}=2\mathrm{sqrt}\sqrt{(s_{min}+b)t}, \tag{2}$$

which can be solved for $s_{min}$ as:

$$s_{min}=(2+2\sqrt{1+bt})/t. \tag{3}$$

This goes to $s_{min}=4/t$ in the limit of negligible b, and to $s_{min}=2\sqrt{b/t}$ in the limit of bt much larger than unity. Thus, if b is 1 count/sec in the ROI and t is 12 hours (43,200 sec), $s_{min}$ is 0.0096 cps or 9.6 mBq. If the sample came from 10 m³ of air, then this would correspond to 0.96 mBq/m³ of the original radioxenon isotope in the atmosphere, which is very close to the IMS requirement of 1 mBq/m³ minimum detectable concentrations (MDC) limit for the currently installed detectors. Due to the square root dependence, b would have to be lowered 100-fold to 10 mBq to reduce $s_{min}$ by another factor of 10 to 0.1 mBq/m³ MDC.

The SAUNA Detector

The SAUNA (Swedish Automatic Unit for Noble gas Acquisition) detector was developed as a commercial instrument in a collaboration between PNNL, the Swedish Defense Research Agency (FOI) and GammaData (now Scienta SAUNA Systems) and is a simplified version of ARSA, as shown in FIG. 3. [AXELSSON—2012, FRITIOFF—2014]. Here there is only a single xenon cell 19, again viewed by a pair of PMTs 20 and embedded in a large NaI(Tl) scintillator 21 viewed by a single PMT 22. As in ARSA, the components are isolated by opaque films. Functionally, the system's operation is essentially identical to that of ARSA, producing the same beta-gamma histograms and achieving essentially identical detection limits, but with fewer components.

FIG. 4 shows a typical background spectrum from the SAUNA detector, collected for 604,827 sec. [XECON—no date]. The counts are relatively uniformly distributed in CsI energy and become somewhat denser at lower Plastic energy. The two ROIs shown, 18 and 19 are the $^{133}$Xe decay branches $\beta_{346\gamma81}$ and $(\beta_{346}+CE_{45})x_{32}$, the latter being a triple decay where only the sum of the two electron energies is recorded. The total number of counts observed in these two ROIs, which constitutes the entire $^{133g}$Xe background, was 641, giving a rate of 1.1 mBq. In a 12 hour data collection, about 44 counts would be recorded, on average, with a standard error of 6.6.

The PNNL Improved Detector

Based on their experience with ARSA and SAUNA, PNNL has also developed an "improved" beta/gamma detector as shown in FIG. 5. [COOPER— 2007]. Here the single xenon cell 26 is embedded in a large NaI(Tl) scintillator 27 and viewed by a single 1" PMT 28. For this system to work efficiently, the end of the cell 26 is hemispherical and coated so that any light it emits is directed back toward the PMT 28. Detection limits are not quite as good as ARSA and SAUNA, primarily due to the less efficient light collection from the BC404 xenon cell 26. The data analysis is exactly the same.

The PhosWatch Detector

The PhosWatch detector was developed at XIA LLC in the early 2000's as a different approach to reducing the complexity of the ARSA detector. [HENNIG—2006, WARBURTON—2008]. As shown in FIG. 6, the radioxenon cell is a single spherical BC404 shell 30 embedded in a split CsI(Tl) cylinder 31, with both viewed by a single PMT 32. The whole is surrounded by a reflective coating and a protective housing. Further, there is no optical isolation between the two scintillators—the single PMT sees both the electron detector and the photon detector. This structure is known in the art as a phoswich detector. The PhosWatch electronics detect pulses and apply pulse shape analysis to extract their time structures and so distinguish between an electron hitting the BC404, a gamma or x-ray hitting the CsI(Tl), or a coincidence where both occur simultaneously.

This method is illustrated in FIG. 7. BC404 is a fast scintillator, with about a 2 ns rise time and a 5 ns fall time. Its light emission 35 is complete in fewer than 50 ns. CsI(Tl), on the other hand is more than a factor of 100 slower, with a rise time of about 100 ns and a 1 μs decay time. Its light emission 36 takes over 4 μs to complete. In this detector, a coincidence event is therefore a combined event 37 which has the features of both scintillators. [WARBUR-TON—2008] describes in detail how integrals over various portions of the PhosWatch's output signal are manipulated mathematically to detect whether or not a coincidence is present and to accurately measure the energies deposited in the two scintillators. When carried out properly, energy resolutions are achieved that are essentially identical to those from isolated detectors. When electron-photon coincidences are detected, the two energies are recorded as an [photon energy|electron energy] pair and histogrammed exactly as in the ARSA detector case. The analysis for the radioxenon isotopes also proceeds identically and essentially identical detection limits are achieved. [HENNIG—2009].

Issues for Next Generation Radioxenon Detectors

TABLE 1 shows the Xe isotopes used for nuclear monitoring and their characteristic radiation energies (in keV) and abundances (in percent) [1]. $^{133}$Xe is usually present in much larger quantities that the other isotopes. $^{109}$Cd is shown for reference.

TABLE 1

Emissions and half-lives of the radio-xenon isotopes used to detect nuclear explosions

| | \multicolumn{10}{c}{Isotope} |
|---|---|---|---|---|---|---|---|---|---|---|
| | $^{135g}$Xe | | $^{131m}$Xe | | $^{133m}$Xe | | $^{133g}$Xe | | $^{109}$Cd | |
| | \multicolumn{10}{c}{Half life} |
| | 9.1 hours | | 11.9 days | | 2.19 days | | 5.25 days | | 1.27 years | |
| | E | % | E | % | E | % | E | % | E | % |
| X-rays | 30.6 | 1.5 | 29.4 | 15.5 | 29.4 | 16.2 | 30.6 | 14.1 | 22.0 | 28.9 |
| | 31.0 | 2.8 | 29.9 | 28.9 | 29.9 | 30.1 | 31.0 | 26.0 | 22.2 | 54.5 |
| | | | 33.6 | 7.8 | 33.6 | 8.1 | 35.0 | 7.1 | 24.9 | 13.7 |
| | | | 34.6 | 1.9 | 34.6 | 1.9 | 36.0 | 1.7 | 25.6 | 2.7 |
| γ-rays | 250.0 | 90 | 163.9 | 2.0 | 233.2 | 10.3 | 81.0 | 37.0 | 88.0 | 3.6 |
| β-particles | 905 | 97 | | | — | | 346 | 99 | | |
| CE's | 214 | 5.7 | 129 | 60.7 | 199 | 63.1 | 45 | 54.1 | 63 | 40.8 |
| | | | 159 | 25.8 | 229 | 26.9 | | | 85 | 55.5 |
| Auger K e$^-$'s | | | 24.6 | 6.8 | 24.6 | 7.1 | 25.5 | 5.9 | | |

While the RN stations are generally proving to be sensitive and reliable, better determination of isotope ratios has emerged as an extremely desirable feature in next generation detectors. This would allow better discrimination between nuclear explosions and other radioxenon releases from nuclear power plants (NPP) and radiopharmaceutical facilities (RPF) in two ways. First, isotope ratios vary between sources, and, second, detecting matching isotope ratios at different RN stations confirms the presence of a single release source and so supports the atmospheric transport modeling that assigns its location. A better measurement of the background from NPPs and RPFs is also desirable to create a "world map" of radioxenon levels, including the range of statistical fluctuations that can be considered "normal."

[ELY—2012] recently considered what the technology goals should be for a next generation radioxenon monitoring system, recommending: 1) reducing MDC, particularly for isotopes other than $^{133}$Xe, to a level of 0.3 mBq/m$^3$ or less; 2) reducing collection and processing times, with 6 hours as a desirable target; 3) enhancing reliability while keeping cost, weight, and volume down; 4) automated state-of-health reporting. Ely's suggested approach to these goals was to increase the number of detectors and xenon collection rates so that 24 hour counts could be maintained but with 6 hour sampling intervals. However, this proposal assumed that, for technical reasons discussed below, technology limits have been reached and lower MDC's cannot be achieved with current sample volumes and/or shorter counting times.

Limitations on Existing Beta-Gamma Detectors

As noted earlier, the four Xe isotopes of interest, Table 1, all emit beta particles (β) and/or conversion electrons (CE) in coincidence with x- or gamma-rays (γ) allowing β/γ coincidence detection to be used to suppress random background counts. The resulting 2-D γ-energy versus β-energy histograms are then analyzed to identify which isotopes are present in a sample. [MCINTYRE, 2006]. $^{109}$Cd is shown for reference; it has a decay process similar to $^{131m}$Xe and is used in the laboratory test measurements.

As we saw for the four β/γ detection systems described above, the xenon gas sample is placed into a BC-404 electron detection cell, which is encased in a crystalline scintillator x-/γ-ray detector. The light from the two scintillator systems is collected by one or more PMTs, whose signals are analyzed to detect β/γ coincidences and measure their energies. A 2-D histogram is then made of counts versus the two energies and ROIs defined that characterize the sought-after radioxenon isotopes, as shown in FIG. 1 for the 4 isotopes (the data from $^{133m}$Xe lie on top of counts from its daughter $^{133}$Xe).

Referring to FIG. 2 and Table 1, we see that the primary x/γ-rays are emitted at 30, 81 and 250 keV, CE's must be detected at 45, 129 and 199 keV, and β's at energies up to about 900 keV. Because these are spike sources, one cannot see the Compton scattering background that would normally provide a major limitation on achievable MDC's. These spectra also clearly reveal the second major impediment to achieving low MDC's—the interference between $^{133}$Xe's β spectrum at 31 keV γ energy and both $^{131m}$Xe's [129 keV CE|30 keV x-ray] peak and $^{133m}$Xe's [199 keV CE|30 keV x-ray] peak. Because the concentrations of the isotopes are independent, the $^{133}$Xe counts are essentially "background" for measuring the other two and thus limit MDC per Equation 3. The problem is exacerbated by the fact that $^{133}$Xe has the longest half life and is therefore the dominant species present in most low background samples.

A simple calculation shows the extent to which existing detectors are limited by background and/or interference counts. Consider extracting the xenon from 10 m$^3$ of air containing an isotope at 0.1 mBq/m$^3$. The resulting sample counts at 1 mBq, producing 3.6 counts/hour. In a short 6 hour counting time, a detector with 80% efficiency would collect 18+4.3 counts, allowing the concentration to be detected at the 4 sigma level and measured with approximately 25% accuracy. This shows that the major impediment to detection at the 0.1 mBq/m$^3$ level is background and not sample activity. The background need not be absolutely zero. If, during the same period, 64 background counts were also collected, then the measurement would produce 18±9 signal counts, still allowing detection at the 2 sigma level. Thus, background levels need not be reduced completely to zero, but only to a level where their rates are comparable to the rates from the radio-isotopes.

Beta-Gamma Detectors Using Semiconductor Detectors

Two recent approaches have attempted to address these problems by improving the energy resolution of the detectors. The idea is that, with improved energy resolution, the ROI boxes could be made smaller in one or both dimensions, which would both reduce the number of random Compton background counts falling within their boundaries and reduce the number of $^{133}$Xe [beta| x-ray] counts falling into the $^{131m}$Xe and $^{133m}$Xe [CE| x-ray] ROIs. If the photon energy resolution became very good, with a FWHM less than approximately 500 eV, then the interference between $^{133}$Xe and $^{131m}$Xe and $^{133m}$Xe could be completely resolved because the former's x-ray is a Cs-K x-ray at 30.6 keV, while the latter two emit Xe-K x-rays at 29.4 keV and so the $^{133}$Xe [346 keV beta 30.6 keV x-ray] emission would no longer overlay either the $^{131m}$Xe [129 keV CE 29.4 keV x-ray] peak or the $^{133m}$Xe [199 keV CE 29.4 keV x-ray] peak.

This latter approach was reported by HENNIG—2012, who enclosed the xenon sample in a small cubic cell with 4 large Si PIN diodes on each face (24 total detectors—see FIG. 8) that achieved about 0.6 keV resolution for 30 keV x-rays (2%) and 2.4% for 129 keV CE's. This design had both positive and negative features. Because of the small, low-Z detectors, the coincidence background was essentially zero. However, this also resulted in very low photon detection efficiencies, with almost no cross section for photons above 30 keV. On the other hand, it had a relatively good response to electrons, which allowed additional decay branches (e.g., β/CE coincidences) to be counted. FIG. 9 shows a typical cross-detector histogram for a mixture of $^{133g}$Xe and $^{133m}$Xe. The strong lines at 45 keV 45 and 75 keV 47 result from CE/beta coincidences. The narrower line at 30 keV 48 is from x-ray/beta coincidences. The detector's best MDC, for $^{131m}$Xe, was estimated to be 0.16 mBq/m$^3$ using a 12 hour count and Xe from 20 m$^3$ of air. The complexity of 24 detectors and their associated electronics, plus the need for cooling to achieve the reported energy resolution suggest that it would be very difficult to commercialize this design.

A somewhat different approach was reported by LE PETIT—2012. In that design, the two large walls of a pancake shaped xenon gas volume were made of large area silicon PIPS detectors, which are thin enough to pass both x- and γ-rays. The assembly was sandwiched between two fairly large NaI(Tl) photon detectors. The whole was shielded by 3 layers of increasingly low background lead and included a cosmic ray veto. The PIPS detectors achieved 4% CE energy resolution at 129 keV and a $^{131m}$Xe MDC of 0.13 mBq/m$^3$ using a 24 hour count and Xe from 40 m$^3$ of air. Because the photon detectors are NaI(Tl), the design does not resolve the β/CE interference issue discussed above.

To further complicate matters, the report in HENNIG—2012 and other XIA work [COX—2011] have shown that the Xe sample volume must be restricted to achieve good CE energy resolution because electrons traveling various distances through the xenon sample gas to the detector lose different amount of their initial energies, smearing their energy resolution. This suggests that it may be impossible to significantly lower MDC's by simultaneously working with larger samples and improved CE detector resolutions.

Conclusions and Requirements for an Improved Beta-Gamma Radioxenon Detector

Most existing beta-gamma radioxenon detectors use beta-gamma coincidence counting to reduce background counting rates sufficiently to allow detection of the Xe radio-isotopes $^{131m}$Xe, $^{133m}$Xe, $^{133}$Xe, and $^{135}$Xe at the 1 mBq/m$^3$ level using Xe collected from 10-20 m$^3$ of air and counting periods ranging from 12-24 hours. However, in order for both to discriminate between nuclear explosions and other anthropogenic sources of radioxenon and to develop reliable models of radioxenon background levels there remains a need for counters that can reliably detect and measure these isotopes at the 0.1 mBq/m$^3$ level using Xe collected from 10 m$^3$ samples and shorter 6 hour counting times.

SUMMARY OF THE INVENTION

A simple analysis shows that, operating at these activities, there are still an adequate number of decays, provided that background counting rates, either from natural background radiation or from other radioxenon isotopes, can be reduced to levels that are comparable to the counting rates from the radioxenon isotopes themselves.

The present invention teaches techniques, both method and apparatus, for measuring the concentrations of multiple dilute radioxenon isotopes in a gaseous sample in a manner that lowers minimum detectable levels (MDLs) by both lowering backgrounds from naturally occurring radiation and by also reducing interferences between the radioisotopes themselves. The method allows lower MDLs to be obtained using shorter counting times and smaller volumes of atmosphere from which the radioxenon sample is extracted.

In brief, in its preferred form, the method surrounds a Xe sample cell with N multiple sub-detectors that are separately sensitive to both the energetic electrons, including betas and conversion electrons, and the energetic photons, including x-rays and gamma-rays emitted by the radioxenon isotope decays. The detectors are connected to N channels of electronics that can detect events occurring within the sub-detectors, measure their energies, and also detect coincidences occurring between them. A Xe sample is introduced into the sample cell and measured. During the measurement, whenever a coincidence is detected between two events, their two measured energies are used to record a point in a two-dimensional histogram. Whenever a coincidence is detected between three events, their three measured energies are used to record a point in a three-dimensional histogram.

Regions of interest (ROIs) are established within both the two-dimensional histogram and the three-dimensional histogram that correspond to decay paths of the radioxenon isotopes to be measured. After the measurement, estimates of the concentrations of the several radioxenon isotopes are computed, based on the number of counts collected in each of the ROIs. Additional ROIs can be established that do not correspond to any decay paths of the radioxenon isotopes and the counts within these ROIs used to estimate the number of background counts in the ROIs that do correspond to the said decay paths.

Throughout our discussion, by the "dimension" of a histogram we mean the number of its energy axes. Also, by "coincidence" we mean the simultaneous emission and detection of two or more photons or electrons, whether these emissions are captured in the same or in different sub-detectors, with "simultaneous" having its usual nuclear electronics meaning: namely occurring within a short preset time of one another, typically 50-100 ns.

In our two preferred embodiments, the sub-detectors are phoswich detectors and the electronics are capable of detecting coincidences occurring within the same sub-detector as well as between different sub-detectors. In particular, each phoswich detector includes a first detector element that is sensitive to energetic electrons and a second detector element that is sensitive to energetic photons, coupled to each other and to a photodetector. Typically, the first detector element is a fast plastic scintillator, the second detector element is an inorganic scintillator, and the photodetector is a photomultiplier tube. The electronics, by distinguishing between events occurring in the first and second detector elements, thereby also distinguish between electron and photon events in the sub-detectors.

Exploiting this additional information, we employ multiple two-dimensional and three-dimensional histograms and sort coincidences into them according to the event types the coincidences contain, producing, for example, [photon|electron] and [electron1|electron2] two-dimensional histograms and [photon|electron1|electron2] and [photon1|photon2|electron] three-dimensional histograms. ROIs can now be defined in these plots corresponding to the known electron and photon energies emitted by the various decay paths of the several radioxenon isotope decays to be detected.

In beta-gamma radioxenon detectors the major source of background counts arises from environmental radiation, both cosmic and terrestrial, that Compton scatters within the detector producing "coincident" events unrelated to the decay of Xe radioisotopes. In working with our invention detector we have discovered that [electron|photon] Compton scattering events are over a factor of ten times more likely to occur within the same sub-detector than between sub-detectors. Therefore, in preferred embodiments, when a double coincidence between an electron and a photon occurs in the same sub-detector, the two energies are used to record a point in a separate two-dimensional [electron|photon] histogram which has its own ROIs and the counts within these ROIs contribute a separate term toward the estimation of the concentrations of the several radioxenon isotopes. This method results in a substantial background reduction in the two-dimensional histogram used for the remaining [electron|photon] coincidences.

As a practical matter of fabricating our preferred embodiments, we place an optical coupling element between the second detector element and the photodetector to provide clearance space for the latter in the volume surrounding the fully assembled set of N sub-detectors. In some embodiments the coupling element is made of a material selected so that its index of refraction lies between those of the second detector element and the photodetector to optimize the transmission of light between them. In other embodiments, the coupling can be a third scintillator detector element, whose decay time differs sufficiently from the first and second detector elements' decay times so that the electronics can distinguish between them. A factor of four to five is typically sufficient for reasonable performance. If it is made of a higher density material, this third detector element can be used to increase the sub-detector's detection efficiency for higher energy gamma-rays. It can also be used as an active veto system to electronically shield the sub-detector against cosmic ray events and thereby reduce the background in the detector assembly.

Finally, in our preferred embodiments, the Xe sample cell is formed by joining together the N sub-detectors. No specific joining method is preferred, as a wide variety of adhesives, epoxy optical cements, or low temperature solders could be employed.

The design achieves its low backgrounds in several ways. First, by using small detectors, it minimizes their cross section to external radiation. Second, we have found that, when the detection system is subdivided into multiple smaller phoswich detectors, electron-photon noise coincidences are more likely by a factor of order ten when both the electron and the photon interact in the same phoswich detector, rather than in different detectors ("cross detection"). Since electron-photon signal coincidences occur with equal probability per detector in the same or cross detectors, this effectively lowers the cross detector backgrounds by the same factor of ten compared to prior art detectors consisting of a single plastic radioxenon cell and a larger surrounding crystal scintillator, where both signal and background coincidences all occur is a single detector pair. Third, those radioisotopes that are detected by triple coincidences are detected against a background of random triple coincidences, which is much lower than the double coincidence background.

The design further reduces the background caused by inter-isotope interferences, which were described above, according to a principle we call "geometric partitioning." As discussed, the major interference is caused by $^{133g}$Xe, which decays with the triple coincident emission of a β particle, a conversion electron (CE), and a Cs-K$_\alpha$ x-ray, but is detected in prior art (β/γ detectors as a double coincidence between the electron detector (β+CE) and the photon detector (x-ray). Because the β energy is variable, some of these events fall into ROIs set for $^{131m}$Xe and $^{133m}$Xe, which both decay with the double coincident emission of a CE and a Xe-K$_\alpha$ x-ray. In the present invention, the N detectors partition the solid angle surrounding the radioxenon cell into N distinct regions. Therefore, when a $^{133g}$Xe decays and the x-ray, CE and β are all emitted randomly into 4π solid angle, the chance that the CE and β hit the same electron detector is approximately only 1/N. Thus the great majority of events deposit energy in one photon detector and 2 electron detectors, are recognized as triple coincidences, and removed entirely from the double coincidence decay histograms. This process can be over 90% efficient, thereby reducing the "interference" background by an order of magnitude.

Backgrounds can be further reduced by using a variant of the phoswich detector that has three scintillating elements instead of two. In the preferred implementation presented above, the phoswich detector comprises a low Z, typically organic, scintillator that is sensitive to electrons backed by a higher Z, typically inorganic scintillator such as NaI or CsI that is sensitive to x-rays and gamma-rays. As is common practice with phoswich detectors, the decay constants of the two scintillators are different so that one can use pulse shape analysis to distinguish whether one, the other, or both are emitting light in any given event. These scintillators are coupled to an optical sensor, typically a photomultiplier, using a transparent connecting member that acts as a light guide. In the three element variant the light guide is replaced by a third scintillator, whose decay constant is different from the first two and detected light from this scintillator is used as a veto against minimum ionizing cosmogenic muons, as is well known to those skilled in the art. Because a large fraction of background events are cosmogenic in origin, this serves to further reduce both the double and triple coincidence backgrounds. With appropriate analysis, these third scintillators can also provide enhanced sensitivity to the higher energy γ's emitted by $^{135}$Xe at 250 keV.

We disclose two preferred embodiments. In the first, six phoswich detectors have their square faced detectors placed on the surface of a cube to form the radioxenon cell. In the second, twelve phoswich detectors have their pentagonal faced detectors placed on the surface of a dodecahedron to form the radioxenon cell. The first design requires fewer components and sets of processing electronics. However its crystals are larger, it has higher backgrounds and rates of interference. The second design achieves lower backgrounds and twice as good interference rejection, but at the obvious cost of twice as many detectors and sets of electronics.

Because of their low background rates, the invention detectors can be used with or without the lead shielding that is normally required in ultra-low background beta/gamma detectors. While superior results can be obtained by using the shielding, performance without it is still very good, which can be valuable for mobile or on-site inspection applications.

Finally, the preferred implementations are shown using phoswich detectors because, with current technology, this gives the good sensitivity and detection efficiency for both photons and electrons at a reasonable cost. However, the principle of geometric partitioning is not dependent on the particular type of detector used and other detector types could be substituted if desired.

A further understanding of the nature and advantages of the present invention may be realized by reference to the remaining portions of the specification and the drawings, which are intended to be exemplary and not limiting.

DESCRIPTION OF SPECIFIC EMBODIMENTS

1. The Principle of Geometrical Partitioning

Figure 10:
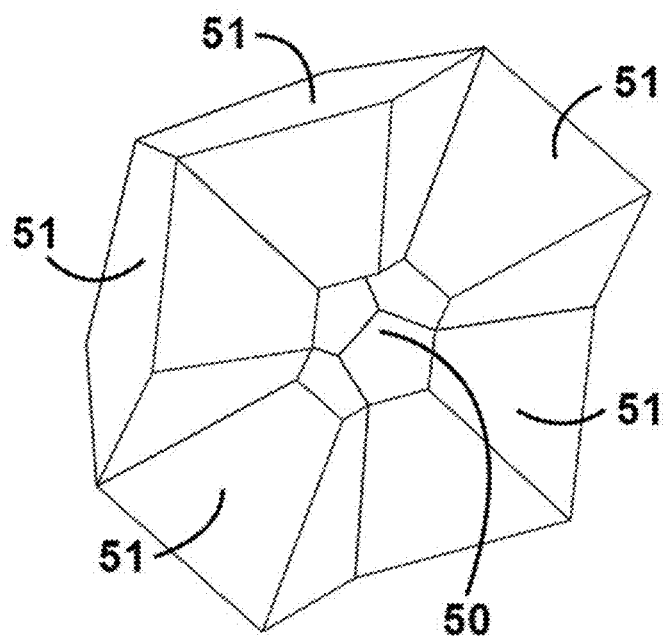
FIG. 10 shows a cutaway view of 12 pentagonal sub-detectors (6 shown) surrounding a dodecahedral radioxenon sample volume in a radioxenon detector according to an embodiment of the present invention.

FIG. 10 shows a schematic cutaway drawing of an embodiment of the invention (β/γ radioxenon detector, comprising a cell 50 for holding the radioxenon surrounded by N sub-detectors 51. In this case N equals 12 with 6 of the sub-detectors removed so that the detector cross section can be seen. The sub-detectors are chosen to be sensitive to both energetic electrons (β's or CE's) and to photons (x-rays and γ-rays). The sub-detectors 51 are sealed together (glued or soldered, for example) so that the radioxenon cell 50 is gas tight. Not shown are the tubes or passages necessary to introduce the radioxenon to the cell for measurement and remove it afterwards.

For reasons that will become clear, the gaps between the faces of the sub-detectors are made as small as reasonably possible within the constraints imposed by detector fabrication costs on the one hand and overall detector rigidity and durability on the other. Each sub-detector is equipped with a channel of processing electronics, either analog or digital, capable of detecting events within the sub-detector and measuring their energies and times of arrival. In addition, the electronic processing system contains means for detecting "coincident" events that occur simultaneously in multiple detectors, where "simultaneously" means within a small, predetermined time window (e.g., 50-100 ns). Both the channel and coincidence detection electronics are well known to those skilled in the art of nuclear electronics.

Presuming the individual sub-detectors 51 to be sensitive to both electrons and photons, as specified, we next consider what we will observe if the cell 50 is filled with $^{135g}$Xe, whose major decay mode (90% per Table 1) consists of simultaneously emitting a γ at 250 keV and a β whose endpoint energy is 905 keV. The γ is captured in a first detector (detector 1), which records its energy as 250 keV, plus or minus the usual energy resolution. What about the β? The direction of emission of the β is uncorrelated to the direction of emission of the γ, meaning that, on average, it will strike the same detector as the γ did only 1 time in N, and strike some other detector (detector2) (N−1)/N percent of the time. Only the latter case will be recorded by the electronics as a "coincidence" because the whole concept of "coincidence" involves comparing times of arrival of events in different detectors. The former event will be recorded as a "single" with a measured energy equal to the sum of the β and γ energies.

Figure 11:
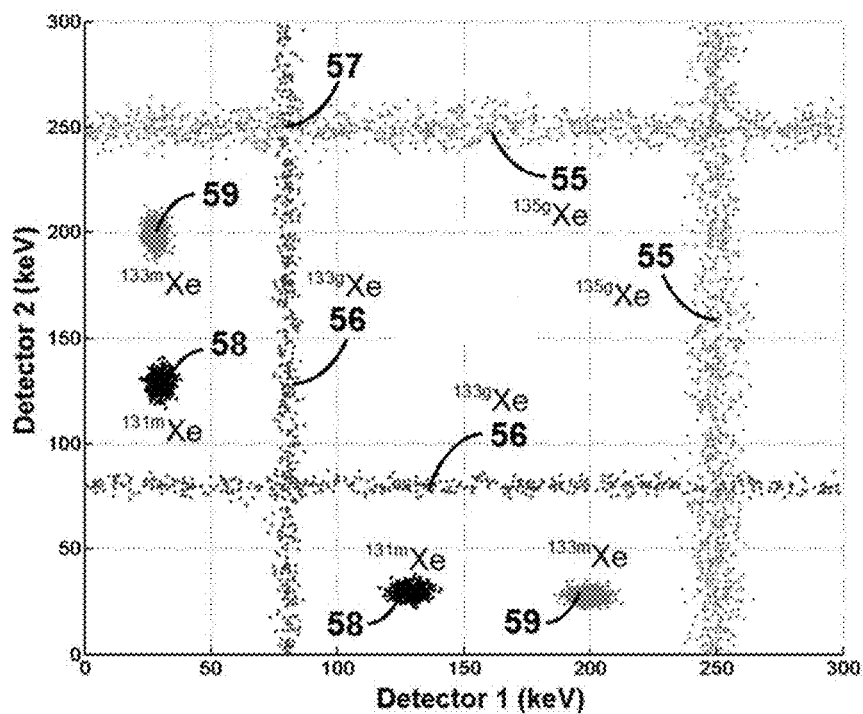
FIG. 11 shows a conceptual cross detector histogram between 2 sub-detectors (double coincidence) in the radioxenon detector shown in FIG. 10.

If we now record many coincidence events between pairs of sub-detectors, always calling one member of the pair "detector1" and the other "detector2" and plot the events on a histogram of Energy(detector2) vs. Energy(detector1), as shown in FIG. 11, we will obtain the crossed pair of lines 55 indicated. These lines always show a fixed energy in one detector (the one that absorbed the γ) and a variable energy in the other (that captured the β). The width of the lines is given by the sub-detectors' γ energy resolution. There are two lines because the γ is equally likely to strike either detector.

When $^{133g}$Xe is introduced into the cell, the detector again produces a pair of crossed lines 56 in FIG. 11 in response to the decaying isotope's emission (37% per Table 1 of an 81 keV γ and a β with 346 keV endpoint energy. We note that, except for the small intersections 57, there is essentially no overlap between this histogram 56 and $^{135g}$Xe's histogram 55 and hence very little interference between these two decay modes.

Next, consider $^{131m}$Xe, whose primary decay mode (60.9%, per Table 1) is by emission of a CE at 129 keV and an x-ray of about 30 keV. The detector's response, shown in FIG. 11, is a pair of isolated peaks 58 at these energies whose dimensions are determined by the sub-detectors' photon and electron energy resolutions. $^{133m}$Xe, whose primary decay mode (63.1%, per Table 1) is by emission of a CE at 199 keV and an x-ray of about 30 keV, produces a similar pair of spots 59. There is no overlap between any of these spots, either with each other or with the lines from $^{133g}$Xe or $^{135g}$Xe. Hence we see that there is essentially no interference between any of the Xe radioisotopes when only their true, two emission decays are considered.

As discussed above, however, the major decay mode of $^{133g}$Xe is not its two-emission decay, but instead a three-emission decay (54.1% per Table 1) consisting of a β with endpoint energy of 346 keV, a CE with 45 keV, and an x-ray of about 30 keV. How will these emissions interact with the N sub-detectors in the invention detector? Let us count the ways, which are determined by the solid angles subtended by the sub-detectors as viewed from the location of the decaying radioxenon nucleus. We call this principle "geometric partitioning." While these solid angles, and resultant partitioning, will clearly vary depending upon the precise location of the nucleus within the Xe cell 50, the concept is well described by considering the nucleus to be located at the center of the cell.

Figure 12:
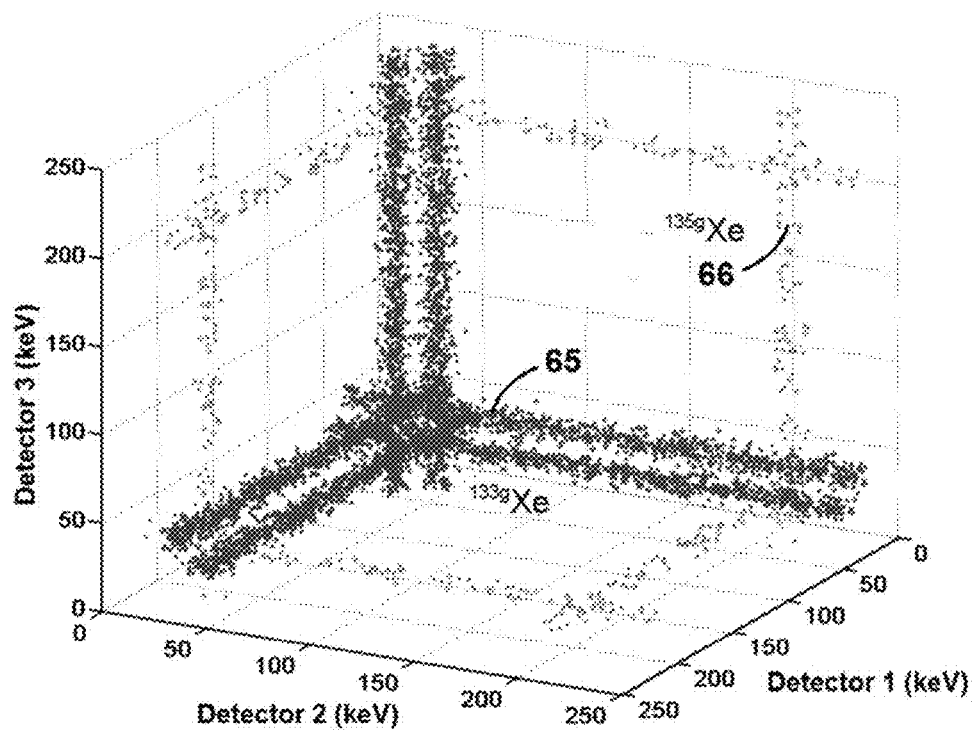
FIG. 12 shows a conceptual cross detector histogram between 3 sub-detectors (triple coincidence) in the radioxenon detector shown in FIG. 10.

The resulting division of emissions is as follows. First, $1/N^2$ times, all emissions will strike the same sub-detector. Second, $(N-1)/N^2$ times the β and CE will strike the same sub-detector but the x-ray will hit a different sub-detector, producing a [β+CE|x-ray] double coincidence. The [β+x-ray|CE] and [β|CE+x-ray] double coincidences also occur with $(N-1)/N^2$ probability. Third, the β, CE, and x-ray strike different sub-detectors, producing a [β|CE|x-ray] triple coincidence with $(N-1)(N-2)/N^2$ probability. FIG. 12 shows the triple coincidences, which appear as six bars 65 in a 3-D plot whose axes are the energies deposited in Detector1, Detector2, and Detector3, again arbitrarily assigned. A similar set of bars 66 are produced by $^{135g}$Xe, which has a minor (5.7% per Table 1) triple-emission decay consisting of a 905 keV endpoint energy β, a 214 keV CE, and an x-ray of about 30 keV.

The electronics, of course, do not know the source of the $^{133g}$Xe [β+CE|x-ray], [β+x-ray|CE] and [β|CE+x-ray] double coincidences and so add them to the double coincidence histogram, FIG. 11. In particular, the [β+CE|x-ray] double coincidence, with its variable electron energy and 30 keV x-ray energy would fall directly over the $^{131m}$Xe and $^{133m}$Xe spots 58 and 59, interfering with a precise analysis of the number of counts they contain. Similarly, the [β|CE+x-ray] double coincidence would form a line at the combined CE+x-ray energy (45 keV plus 30 keV) that would similarly interfere with the analysis of the $^{133g}$Xe [β|γ] double coincidence line at the 81 keV γ energy.

The important point here is that only triple coincidences that are not correctly identified have the potential to be placed into the double coincidence histograms and interfere with the analysis of the intensities of the true double coincidences. In prior art systems all triple coincidences are placed into the double coincidence histograms. In the present invention, through geometric partitioning, most of the triple coincidences can be correctly identified, placed into their own histogram, and so prevented from interfering with the 2-D analysis. In the case just discussed, for example, only $(N-1)/N^2 \approx 1/N$ of $^{133g}$Xe decays can interfere with the analysis of $^{131m}$Xe and $^{133m}$Xe. By making N of order 10, the invention therefore provides a method of reducing this interference by an order of magnitude.

2. Background Measurements

2.1 Detector Configuration

Figure 13:
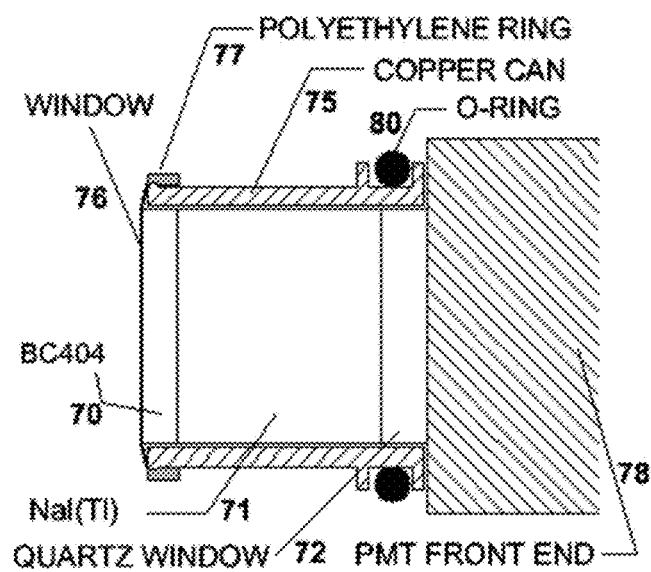
FIG. 13 shows a schematic drawing of a prototype phoswich sub-detector.

Early tests of our invention were made using sub-detectors structured as shown in FIG. 13. These were phoswich detectors comprising a 2 mm thick BC404 first element 70 as an electron detector and a crystal scintillator 71 second element as a photon detector. Crystals of both NaI(Tl) and CsI(Tl) were used, in thicknesses of 2, 3, and 6 mm to evaluate background as a function of photon detection efficiency. All detectors were 12.7 mm in diameter. Prior to choosing these materials we performed GEANT studies to estimate electron detection efficiencies. These studies showed that electron reflection from the detectors increased very rapidly with the atomic number Z of the detector material.

This means that both crystal scintillators such as NaI(Tl) and CsI(Tl) and semiconductor materials such as Si have much higher reflectivities than organic scintillators such as BC404 or stilbene. Since geometric partitioning does not work well if a reflecting electron deposits energy in multiple detectors, we selected BC404 as our electron detector material. On the other hand, BC404 has essentially no efficiency for photons, even at the lowest energies of interest: 30 keV. This led to the phoswich design shown, with either NaI(Tl) or CsI(Tl) as the photon detector. In practice, using a phoswich detector is also beneficial in geometric partitioning since having the photon detectors be insensitive to electrons and the electron detectors be insensitive to photons effectively increases the number N of sub-detectors, further reducing the interference between the Xe radio-isotopes.

The two detectors 70 and 71, plus a quartz window 72 were glued into a thin Cu can 75, whose entrance was covered by a thin aluminized Mylar window 76 clipped in place by a polyethylene ring 77. The function of the window was to reflect light back into the detector and to provide a moisture barrier. The detector was attached to a PMT 78 using optical grease and inserted into one face of a cubical Cu housing. A gas tight seal between the detector and the cube was effected with an O-ring seal 80. In a typical experiment, either the three NaI phoswich or the three CsI phoswich detectors were inserted into the cube at once and its other three faces sealed with plates. The inner cell thus formed was flushed continuously with dry $N_2$ gas. Two different PMTs were used, the Hamamatsu 9800 and the Electron Tubes 9124. The PMT outputs were read out using an XIA Pixie-500e 4-channel digital pulse processor and the resultant traces analyzed using in-house IGOR-based software developed for PhosWatch data analysis. [HENNIG—2009].

We performed tests to establish the resulting detector systems functioned at β/γ detectors by inserting isotope sources of $^{109}$Cd and $^{133}$Ba into the cell interior. $^{133}$Ba is particularly interesting because, like $^{133g}$Xe, it decays to $^{132}$Cs and therefore shares the same set of excited nuclear levels and emits many of the same decay products. A major difference is that, because $^{133}$Ba decays by electron capture, it always emits either a Cs-K x-ray or a CE in addition to any other decay products.

Figure 14:
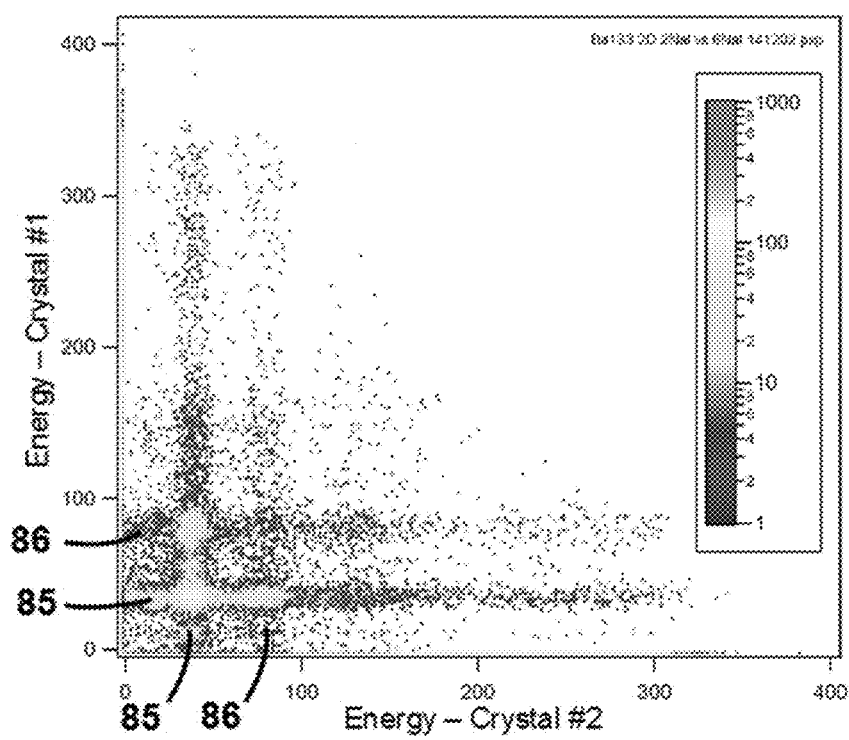
FIG. 14 shows a cross detector histogram, between two NaI(Tl) sub-detectors, using a $^{133}$Ba source.

FIG. 14 shows a $^{133}$Ba double coincidence histogram taken between the NaI(T1) crystals in a pair of sub-detectors. The two major lines 85 at 30 keV are coincidences between a K x-ray in one detector and a gamma-ray in the other detector. The NaI(Tl) detectors, as noted above, cannot see 3 particles, which are absorbed first in the BC404 detector layer. The elongated energy distributions that, in FIG. 11 (55 and 56), arose from 3 particles are here as a result of the many different γ energies that can be emitted in the $^{133}$Ba decay. Similarly the line 86 at 81 keV arises from the emission of an 81 keV γ (see line 65 in FIG. 11) and the same complex set of γ energies that are found in line 85. The important thing about this histogram is that it shows that the coincidence electronics work correctly, that the detectors are sensitive to the two photon energies of primary interest (30 and 81 keV), and that geometric partitioning works as predicted. Similar spectra between NaI(Tl) and BC404 in the same and different sub-detectors showed that electron-photon coincidence detection worked equally well. These spectra can also be used to energy calibrate the sub-detectors.

2.2 Double Coincidence Backgrounds

Figure 1:
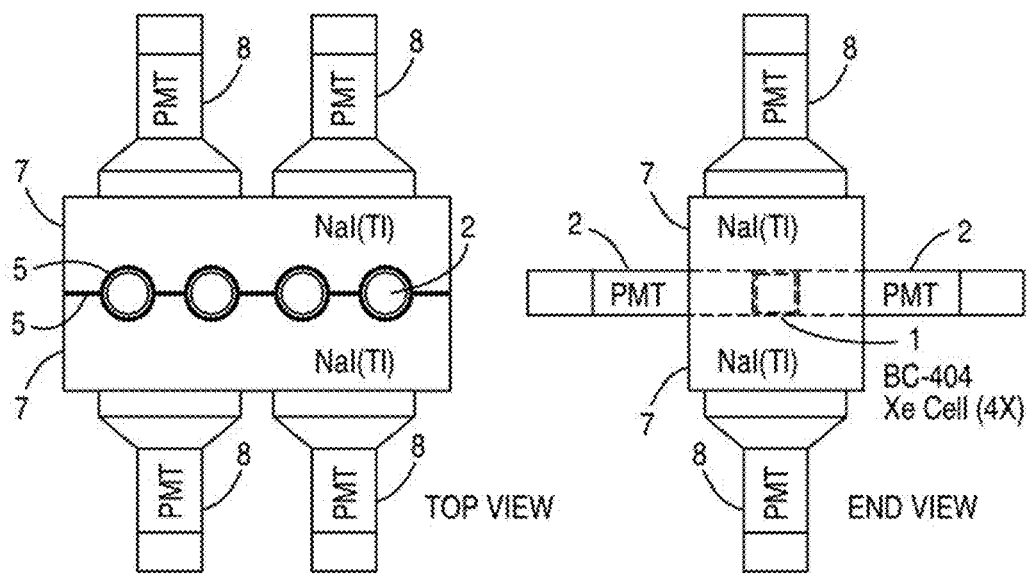
FIG. 1, which is prior art, shows a schematic cross section drawing of the ARSA beta/gamma detector developed at Pacific Northwest National Laboratory using 12 PMTs.
Figure 2:
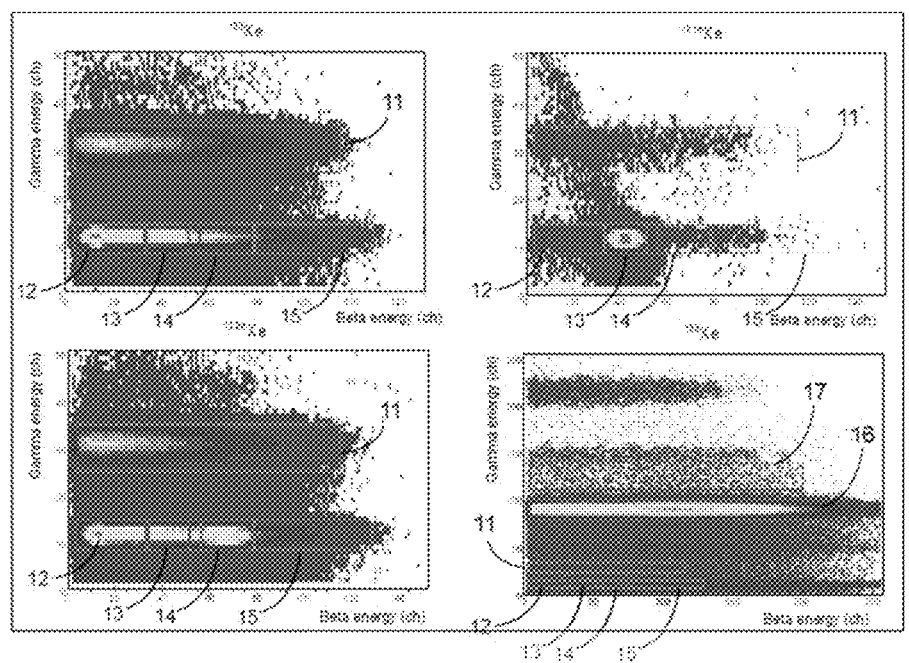
FIG. 2, which is prior art, shows a 2-D Histogram of count rate versus gamma and beta energies collected from the detector shown in FIG. 1.
Figure 3:
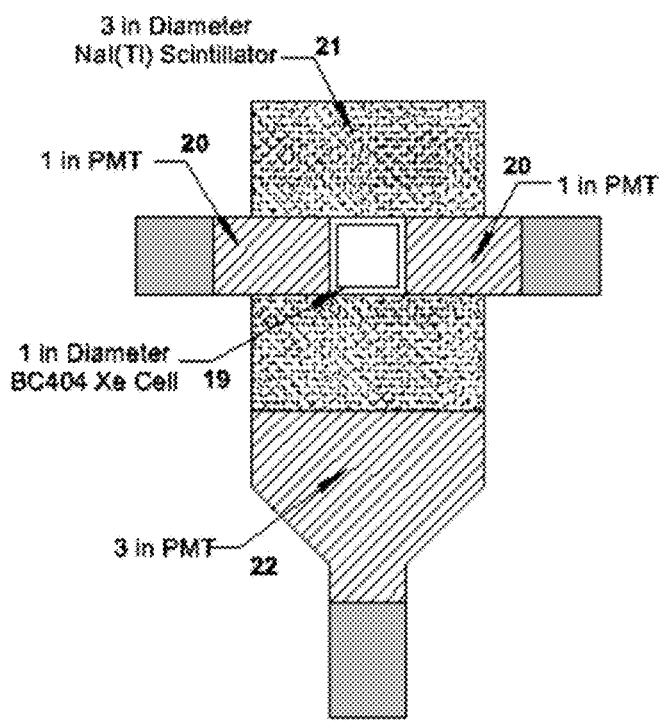
FIG. 3, which is prior art, shows a schematic drawing of the SAUNA beta/gamma detector head, developed at FOI in Sweden, that uses 3 PMTs.
Figure 4:
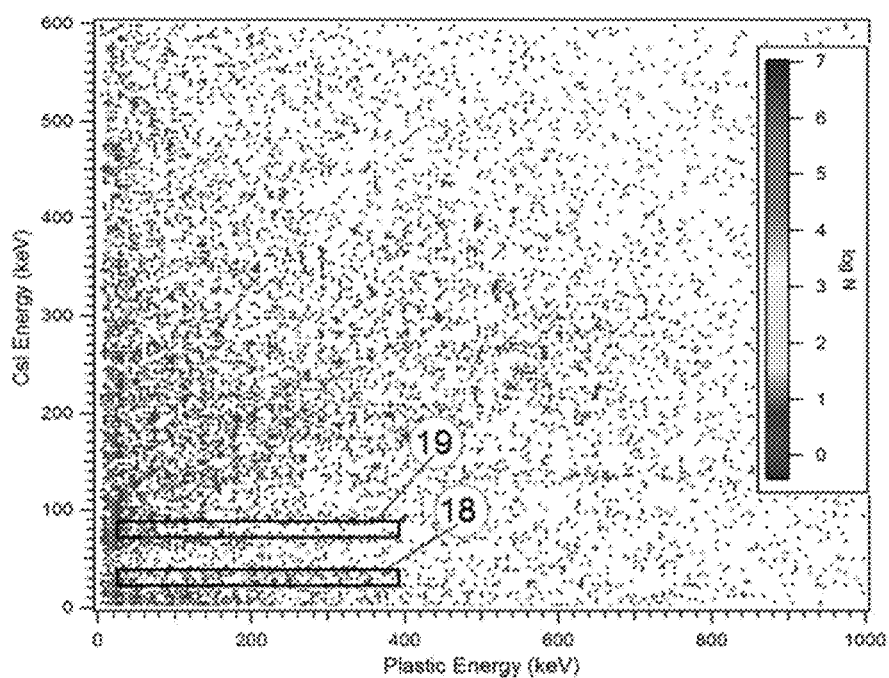
FIG. 4, which is prior art, shows a sample SAUNA beta-gamma background spectrum.
Figure 5:
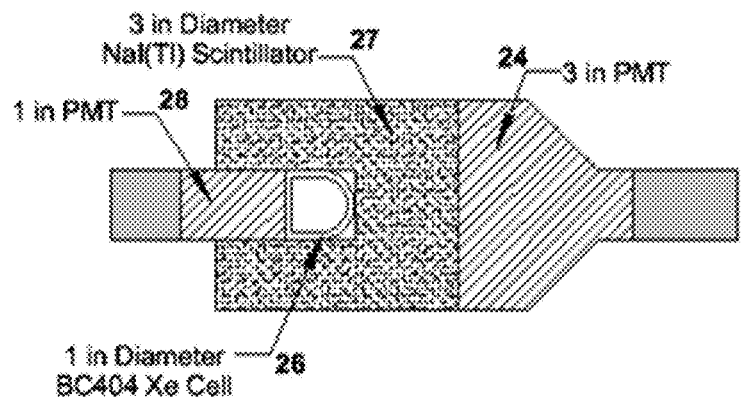
FIG. 5, which is prior art, shows a schematic cross section drawing of an improved beta/gamma detector developed at PNNL that uses 2 PMTs.
Figure 6:
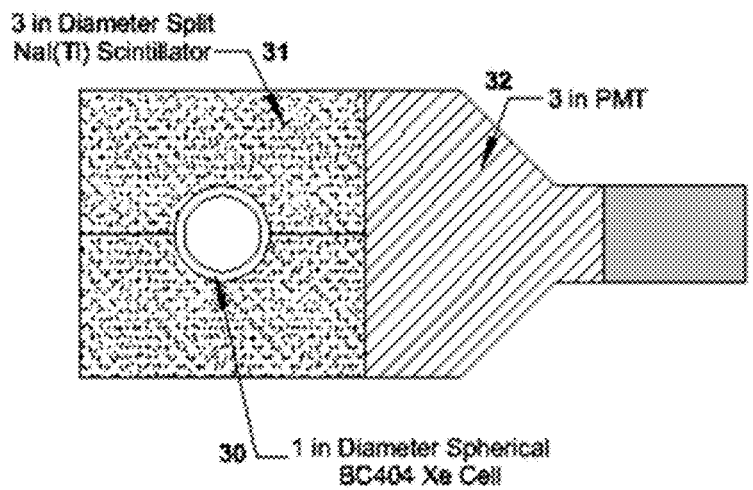
FIG. 6, which is prior art, shows a schematic drawing of the PhosWatch phoswich beta/gamma detector developed at XIA LLC that uses 1 PMT.
Figure 8:
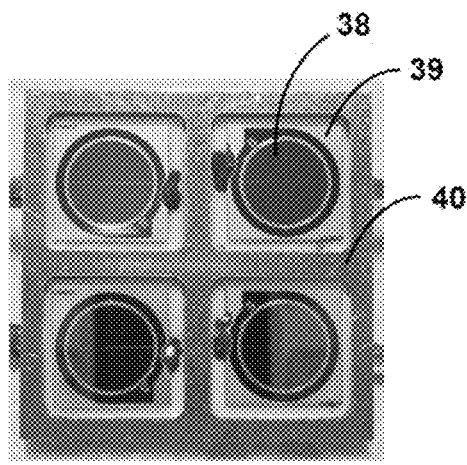
FIG. 8, which is prior art, shows 1 face, with four Si PIN diode detectors, of the Hennig beta/gamma detector.
Figure 7:
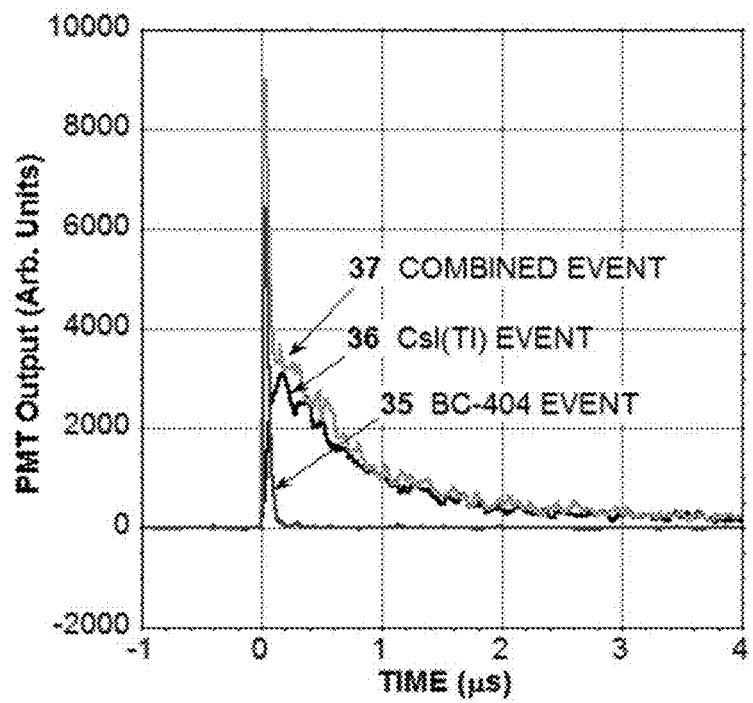
FIG. 7, which is prior art, shows typical pulse shapes output by a PhosWatch phoswich detector.
Figure 9:
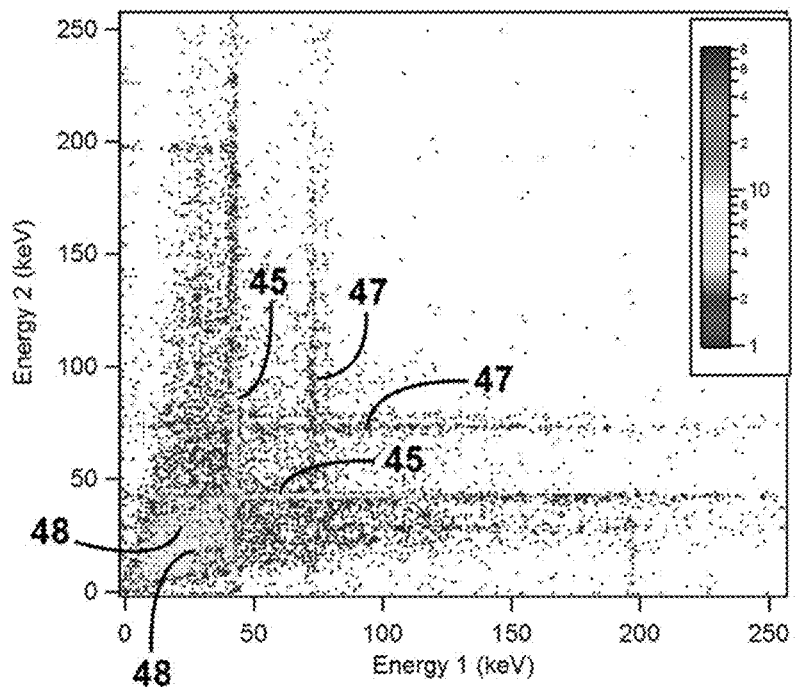
FIG. 9, which is prior art, shows a beta/gamma histogram taken using the detector of FIG. 8 from a mixed $^{133m}$Xe+$^{133g}$Xe sample.
Figure 15:
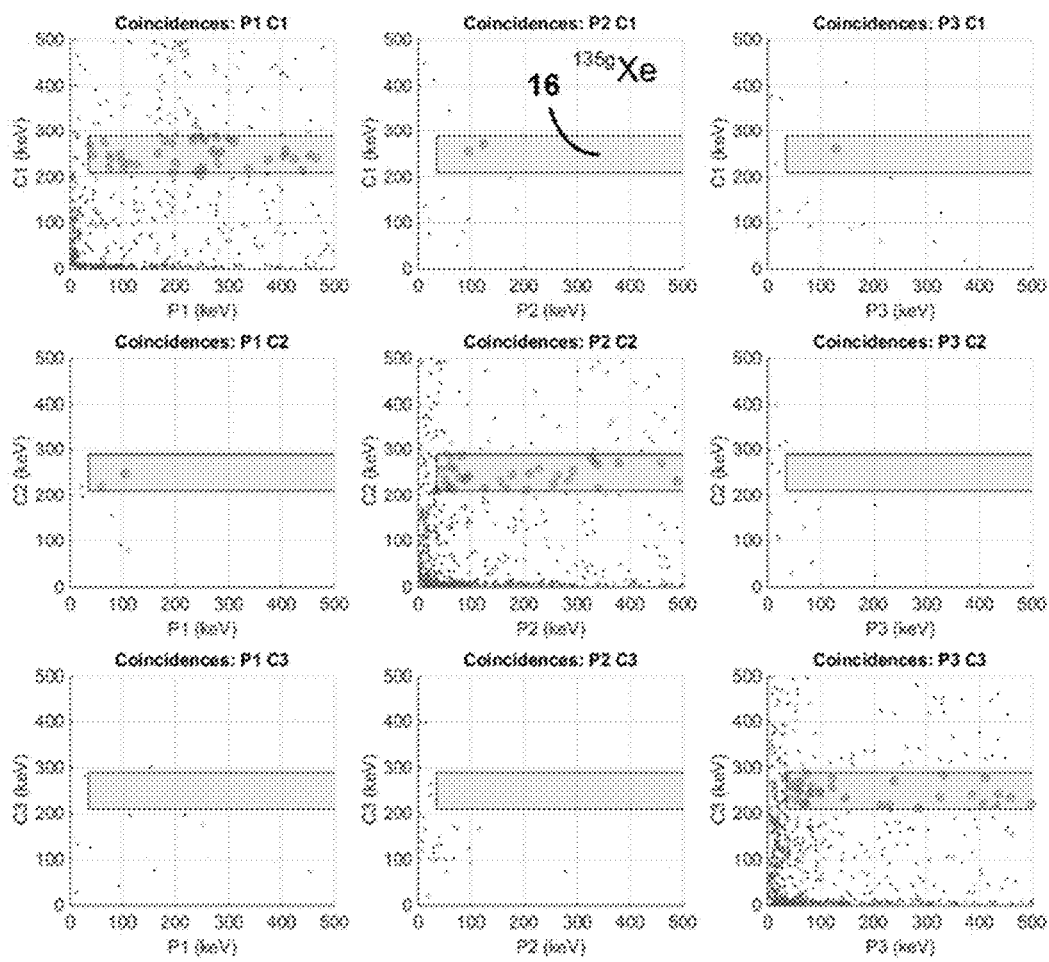
FIG. 15 shows double coincidence background histograms for all 9 possible plastic-CsI(Tl) combinations between 3 phoswich sub-detectors with the $^{135}$Xe [250 keV γ|905 keV β]ROI marked.

Background histograms were then collected with the same detector systems (3 sub-detectors mounted in a Cu cube) for periods of 24 hours with the detectors unshielded and shielded by 0.25", 0.50", 0.75", and 2.0" of lead. Double coincidence histograms were then constructed for all the possible detector pairs. FIG. 15 shows the 9 possible histograms between a BC404 and a NaI(Tl) detector belonging to one of the three sub-detectors in the cube. The identity of the detectors involved are indicated above each histogram, where "P" (for "plastic") gives the BC404 sub-detector number and "C" (for "crystal") gives the NaI(Tl) sub-detector number. On each histogram the ROI for detecting $^{135g}$Xe (16 from FIG. 2) is indicated and any events falling within the ROI are circled. The interesting discovery here is the great asymmetry between the responses between same sub-detector pairs (i.e., P1-C1) and different sub-detector pairs (i.e., P2-C1). The former have typically 20 hits within the ROI while the latter have 0 to 2. Comparing total coincidence background rates to a prior art (PhosWatch) β/γ detector, we find the overall counting rates in the invention detector are somewhat lower, because of its smaller detector volumes, while the cross detector rates in the invention sub-detectors are over an order of magnitude lower. Since these produce $(N-1)/N^2$ of the total $N^2$ possible histograms (e.g., 90% where N=10), this phenomenon effectively lowers the whole detector background by the same order of magnitude.

We can therefore conclude that, by sub-dividing a phoswich detector, such as the PhosWatch, into N sub-detectors, we obtain two major benefits. First, through geometric partitioning, we reduce inter-isotope interference by a factor of approximately N. Second, the detector's background counting rate is also effectively reduced by the same factor of N.

To estimate background rates as a function of lead shielding, we first constructed a table, TABLE 2 below, which shows radioxenon coincident emissions used in background estimations. Photon and electron energies are shown as subscripts. ROIs were estimated from our measured resolutions of the ROIs that would be used with the invention detector to detect the four Xe radioisotopes.

TABLE 2

ROIs for detecting the various Xe radioisotope emissions

| Type | Nucleus | Emission | | | Associated ROI Boundaries (keV) | | |
|---|---|---|---|---|---|---|---|
| | | $1^{st}$ | $2^{nd}$ | $3^{rd}$ | Plastic-1 | Plastic-2 | Crystal |
| 2-D | $^{133g}$Xe | $\beta_{346}$ | $\gamma_{81}$ | | 23.5-368 | | 61-106 |
| 2-D | $^{133g}$Xe | $\beta_{346}$ | CE$_{76}$ | | 23.5-368 | 56-96 | |
| 2-D | $^{133m}$Xe | | X$_{30}$ | CE$_{199}$ | | 160-239 | 18.5-50 |
| 2-D | $^{135g}$Xe | $\beta_{915}$ | $\gamma_{250}$ | | 23.5-900 | | 227-276 |
| 2-D | $^{131m}$Xe | | X$_{30}$ | CE$_{129}$ | | 104-154 | 18.5-50 |
| 3-D | $^{133g}$Xe | $\beta_{346}$ | X$_{32}$ | CE$_{45}$ | 23.5-368 | 30-60 | 18.5-50 |
| 3-D | $^{135g}$Xe | $\beta_{915}$ | X$_{32}$ | CE$_{213}$ | 23.5-900 | 174-254 | 18.5-50 |

Note that $^{135g}$Xe and $^{133g}$Xe can be detected by both double and triple emission coincidences, while $^{131m}$Xe and $^{133m}$Xe can only be detected by double emission coincidences. The listed decay products will be used in the figures to identify the ROIs (e.g., the first ROI is "$\beta_{346}\gamma_{81}$") As discussed above, interference only occurs when misidentified triple coincidences overlap with double coincidences. Double coincidences do not interfere with each other nor do triple coincidences significantly interfere with each other.

Figure 16:
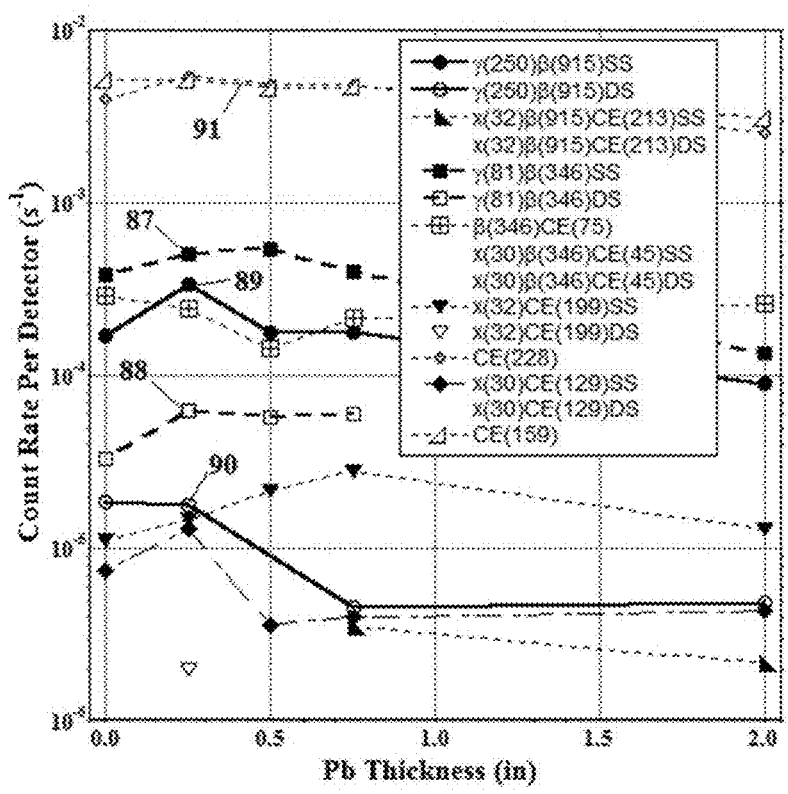
FIG. 16 shows background count rates in several radioxenon ROIs as a function of lead shielding thickness.

For each of the lead thicknesses, background counts were summed over all equivalent ROIs from the three sub-detectors. Counts from cases where the plastic and crystal detectors were in the same sub-detector (labeled "SS") were separated from counts from cases where they were in different sub-detectors (labeled "DS"). The results are shown in FIG. 16. The highest rates were found for $^{133g}$Xe's $\beta_{346}\gamma_{81}$-SS ROI 87, ranging from about $6\times10^{-4}$/sec for 0" of lead to $2\times10^{-4}$/sec for 2" of lead. The same ROI 88 in the cross detector case, $\beta_{346}\gamma_{81}$-DS had rates that were factors of 10-20 lower, ranging from $3\times10^{-5}$/sec for 0" of lead to $6\times10^{-5}$/sec for 0.75" of lead. No counts were collected for 2.00" of lead. $^{133g}$Xe's $\beta_{346}$CE$_{75}$, which interacts in two plastic detectors and hence is always DS, showed rates comparable to the $\beta_{346}\gamma_{81}$-SS ROI.

The next highest ROI was $^{135g}$Xe's $\beta_{915}\gamma_{250}$-SS 89, which had rates in the low $10^{-4}$/sec range. Its DS equivalent, $\beta_{915}\gamma_{250}$-DS 90, was 10-20 times lower, ranging from $2\times10^{-5}$/sec at 0.00" of lead to $4\times10^{-6}$/sec at 2.00" of lead.

2.3 Triple Coincidence Backgrounds

Figure 17:
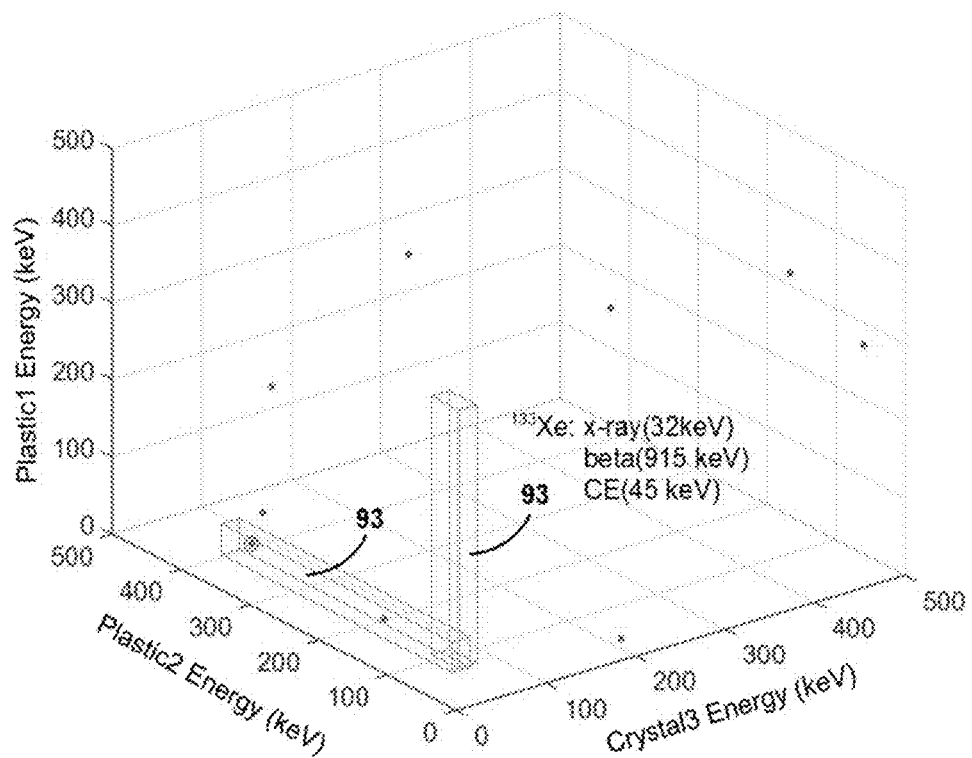
FIG. 17 shows a triple coincidence background histogram between a CsI(Tl) and two plastic scintillators with the $^{133g}$Xe [31 keV x-ray|45 keV CE|346 keV β] ROI marked.

Triple coincidence analysis was carried out similarly to double coincidence analysis, except with an added energy dimension in the histograms. FIG. 17 shows the case of $^{133g}$Xe's $\beta_{915}$x$_{32}$CE$_{213}$-SS ROI, 93 which is configured to collect 32 keV x-rays, 45 keV CEs, and a 915 keV endpoint β. The indicated case was one of only two we found where there was actually a count (the circled point) in the ROI. These cases are shown in FIG. 16 at 0.75" and 2.00" of lead. We had expected the number of random background triple coincidences to be very low and this proved to be true. For the most part, triple coincidence ROIs have an essentially zero background counting rate, even in the absence of lead shielding.

3. Estimated Detection Limits

Based on these background rates, and interference removal from geometric partitioning, we have been able to estimate detection limits for the invention detector. In doing so we made several conservative assumptions about detection efficiencies. First, while our detectors nominally fill 4π around the radioxenon cell 50, each detector has a dead outer layer consisting of its supporting shroud and any glue layer between the shroud and the detector. For this estimation we set this layer to 0.5 mm, producing 95% areal efficiency. Electron detection efficiency is taken to be 90% to add an additional factor for non-absorption and for x-rays and γ-rays we multiply by the detection efficiency of a 6 mm crystal thickness calculated at the photon's energy. Calculations assume that the number of sub-detectors N equals 12.

We next assume that the radio-Xe isotope is present at the 0.1 mBq/m³ level and that it was fully collected from 10 m³ of air (the results can obviously be easily scaled to other volumes and extraction efficiencies), producing a total in-cell activity of 1.0 mBq. A counting time of 6 hours (21,600 sec), then produces 21.6 decays. For a specific decay branch we multiply 21.6 times the branching ratio and again times the efficiency factors for the detection of its decay products and finally by the geometrical partitioning fraction to obtain the number of counts that we would expect to observe on average.

For example, consider $^{135}$Xe's (250 keV γ, 915 keV β) coincidence. We have: Branching ratio=0.90, β efficiency=0.9, γ solid angle=0.95, γ absorption efficiency=0.20. The geometrical partitioning ratio for DS double coincidences is 11/12=0.917. We therefore have:

$$21.6 \text{ counts} \times 0.90 \times 0.90 \times 0.95 \times 0.20 \times 0.917 = 3.05 \text{ counts} \quad (1)$$

Meanwhile, the background rate for this ROI, using 2" of lead shielding was $7.37\times10^{-6}$. Multiplying this by 21,600 sec and 11×12=132 detector pairs gives a background:

$$7.37\times10^{-6} \text{ cps} \times 21,600 \text{ sec} \times 132 = 21.0 \text{ counts} \quad (2)$$

so that, subtracting the background rate from a sample plus background measurement, we have $$3.05 \pm 4.80 \text{ cps}, \quad (3)$$

which is not a statistically significant detection. At 0.40 mBq/m³, however, we have $$12.2 \pm 5.8 \text{ cps}, \quad (4)$$

which is detectable at the 2σ level above background, assuming that the background is well characterized.

For this same 2" lead shielding with CsI/Stilbene detector case, we find that the other three xenon radioisotopes are all detectable at the 0.1 mBq/m³ level. We typically find that, at the lowest signal levels, the "zero background" terms associated with cross detector (DS) ROIs give the best sensitivity. As concentrations rise, because backgrounds remain fixed, other terms begin to contribute to the accuracy of the measurement.

TABLE 3 shows Signal to Noise using CsI/Stilbene sub-detectors, 6 hour counts, and 10 m³ of 0.1 mBq/m³ activity. For cells whose values are not in bold typeface, zero background was measured. The format is in signal-to-noise (counts divided by the SQRT(counts plus background counts)) assuming that an activity of 0.1 mBq/m³ was fully collected from 10 m³ of air and counted for 6 hours. In the majority of cases for $^{133}$Xe, $^{133m}$Xe, and $^{131m}$Xe, no background counts were measured so that the S/N is set only by the number of signal counts detected. Thus 7 counts produces a S/N of 2.67 and 9 counts produces a S/N of 3.

TABLE 3

Compendium of our Estimates by Lead Thickness

| lead/Isotope | $^{135g}$Xe | $^{133g}$Xe | $^{133m}$Xe | $^{131m}$Xe |
|---|---|---|---|---|
| 0.00" | 0.46 | 2.67 | 3.05 | 3.02 |
| 0.25" | 0.67 | 2.67 | 2.40 | 3.02 |

TABLE 3-continued

Compendium of our Estimates by Lead Thickness

| lead/Isotope | $^{135g}$Xe | $^{133g}$Xe | $^{133m}$Xe | $^{131m}$Xe |
|---|---|---|---|---|
| 0.50" | 0.73 | 2.67 | 3.05 | 3.02 |
| 0.75" | 0.52 | 2.67 | 3.05 | 3.02 |
| 2.00" | 0.76 | 2.67 | 3.05 | 3.02 |

These numbers, therefore, clearly suggest that we should be able to detect 0.1 mBq/m³ concentrations of three of the isotopes using 10 m³ of air and a 6 hour counting period. Results did not differ substantially between sub-detectors made of NaI/BC404 sub-detectors made of CsI/Stilbene. As noted in the discussion regarding Equation 4, about 0.4 mBq/m³ of $^{135}$Xe is required for a 2σ detection, with only minor variations depending upon lead shielding thickness. Equation 1 shows that the primary reason for this lowered sensitivity is the poor detection efficiency (20%) for $^{135}$Xe's 250 keV γ in only 6 mm of CsI. We will describe an approach to improving this efficiency in a later section.

4. Reduction of Interferences

As discussed above, in the invention detector, $^{133}$Xe can only interfere with the detection of $^{133m}$Xe and $^{131m}$Xe when both its β and CE strike the same plastic detector, whose fractional occurrence is 1/N, which equals 8.3% of the time for N equal to 12. This reduction is significant. Noting that for the $^{133m}$Xe sensitive ROI there is essentially no background, so that sigma arises only from sum of the number of counts $N_S$ (from $^{133m}$Xe) and $N_I$ (from $^{133}$Xe) counts that land in the ROI. Therefore, if $N_I$ interference counts land in the ROI, we must also collect $N_S$ signal counts given by:

$$N_S = 2\sigma = 2\text{sqrt}(N_I + N_S) \text{ or } N_S = 2(1 + \sqrt{(N_I + 1)}) \quad (5)$$

in order to measure $N_S$ to 2σ precision. Computing $N_I$ as in our background measurement and scaling it by 8.3% times 20% (as an estimate of the fractional overlap) we can generate $^{133m}$Xe's MDC as a function of $^{133}$Xe concentration. Table 4, shown below presents these results that show that it is possible to detect the metastable radioxenon isotopes at the sub-mBq/m³ level even in the presence of 100's of mBq/m³ of $^{133}$Xe, a factor of at least 10 better than with current β/γ detectors.

5. Preferred Embodiment with N Equal to 12

Figure 18:
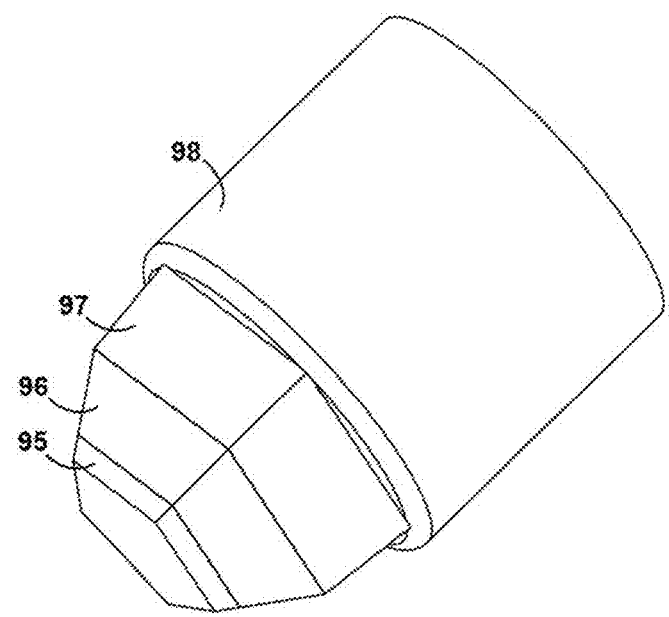
FIG. 18 shows a schematic drawing of a pentagonal cross section phoswich detector and PMT.

FIG. 18 is a schematic drawing of a single sub-detector in a first preferred embodiment, which uses 12 sub-detectors. It is a phoswich with pentagonal symmetry and comprises a plastic scintillator first electron detector 95 attached to a crystal scintillator second photon detector 96 that, in turn, is coupled by an optical coupler 97 to a photodetector 98. The plastic scintillator 95 need not be of any particular composition, beyond having a low atomic number and a decay time that is different from that of the crystal detector by a factor of four or more to be an effective phoswich. Both BC404 and Stilbene have been tested and work well, but many other plastic scintillators would as well.

Table 4 shows $^{133m}$Xe MDC values as a function of $^{133}$Xe concentration resulting from tests run with a detector in an embodiment with N=12.

TABLE 4

$^{133m}$Xe MDC values as a function of $^{133}$Xe concentration

| $^{133}$Xe (mBq/m³) | $^{133m}$Xe MDC (mBq/m³) |
|---|---|
| 1 | 0.08 |
| 3 | 0.12 |
| 10 | 0.19 |
| 30 | 0.31 |
| 100 | 0.55 |
| 300 | 0.93 |
| 1000 | 1.68 |

The crystal scintillator 96 can be any material that is a reasonably good absorption coefficient for photons in the range 30-250 keV. Better energy resolution helps keep backgrounds low by reducing detection ROIs. Both NaI(Tl) and CsI(Tl) have been tried, work well, have good energy resolution and are relatively inexpensive, but many other crystal scintillator materials would also work. The preferred embodiment photodetector is a PMT, selected for its low background radiation levels, for example a Hamamatsu 9800 or an Electron Tubes 9124, but, as in the case of the scintillators, the choice is not critical to the operation of the invention detector. Other types of photodetectors could also be contemplated, for example, silicon photomultipliers (SiPMs). At the current state of the art SiPMs are more expensive, for the same light collection area, and have much higher dark currents that PMTs, but this may change in the future. Or other photodetectors may be developed.

The geometric shape of the scintillators is important to achieving high efficiency and good interference suppression. The face of the first scintillator 95 is pentagonal so that N=12 sub-detectors can fill the surface of a dodecahedral volume that form the radioxenon sample cell 50. Their lateral dimension is determined by the desired cell volume. For a 5 cc volume, for example, the faces are approximately 13 mm across. The taper on the sides of the two scintillators allows the resultant phoswich to be space-filling as one moves back from the sample cell surface. The taper's planar faces are bounded by planes determined by the edges of the pentagonal front face and the center point of the cell. Their angles are easily computed by anyone skilled in solid geometry.

The first function of the optical coupler 97 is to move the N photodetectors far enough back from the scintillators so that they can be packed into the space surrounding the sample cell. For the 5 cc cell example above, this is about 1 cm, assuming a 1" diameter PMT. The angles on the coupler's faces are not at all critical. The coupler's front face must match the rear face of the crystal scintillator 96 and its rear face must fit onto the photodetector's face.

The second function of the optical coupler 97 is to efficiently convey scintillation light from the scintillators to the PMT. When the face of the PMT is quartz, for low background, the coupler can also be made of quartz to match its optical index. For fully optimum performance the optical index of the coupler can be chosen to be about half way between the indices of the PMT 98 face and the crystal scintillator 96. Many plastics have indices in this range and, in addition are relatively easy to machine. Polycarbonate and polystyrene are example materials that can be used.

All three optical elements have highly light reflective surfaces so that the majority of light generated within the scintillators will reach the photodetector. General methods for achieving this are well known in the art. However, the front surface of the plastic scintillator 95 offers certain challenges since it is an electron detector and, ideally, should not have any coating at all. However, if it is not coated, then escaping light will be read by neighboring detectors and produce false coincidences. We therefore compromise by coating it with a very thin layer, in the 50-200 nm range, of Al, which has both a low Z and is highly reflecting. When the first detector is made of BC404, an added layer of 50 nm of $Al_2O_3$ may also be applied to prevent Xe diffusion into the BC404 and producing a "memory effect" as is also well known in the art. [BLÄCKBERG—2011, WARBURTON—2012A, 2012B].

Figure 19:
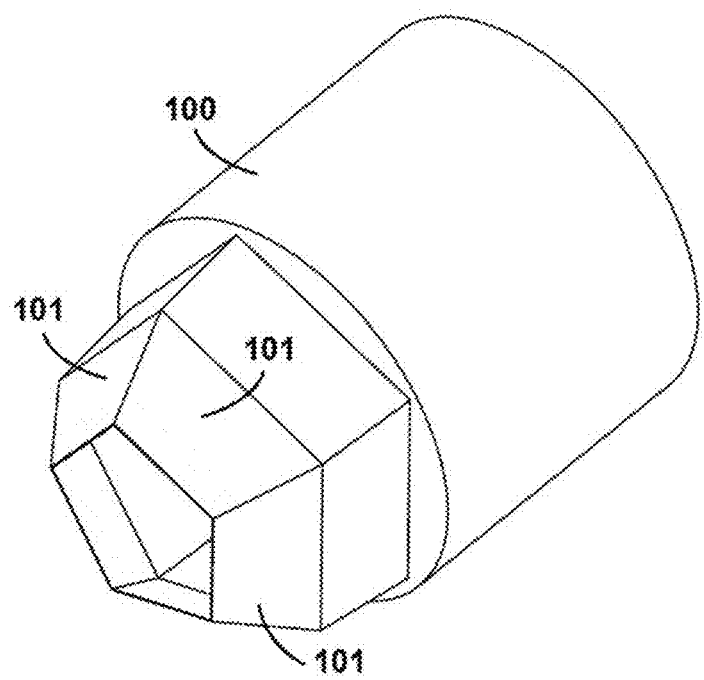
FIG. 19 shows a schematic drawing of a pentagonal cross section phoswich module shell.

In our preferred embodiments, a support structure is used to assemble the sub-detectors into a full detector as well as providing a means to seal the sample cell 50 so that it is gas tight. This structure is not required for the invention to function, however, and other methods of assembling the detector and sub-detectors using glues and applied coatings are not difficult to imagine. As embodied, the support structure is provided by a set of thin conformal shells, one of which, 100, is shown in FIG. 19. Each shell tightly surrounds one of the sub-detector assemblies shown in FIG. 18.

Figure 20:
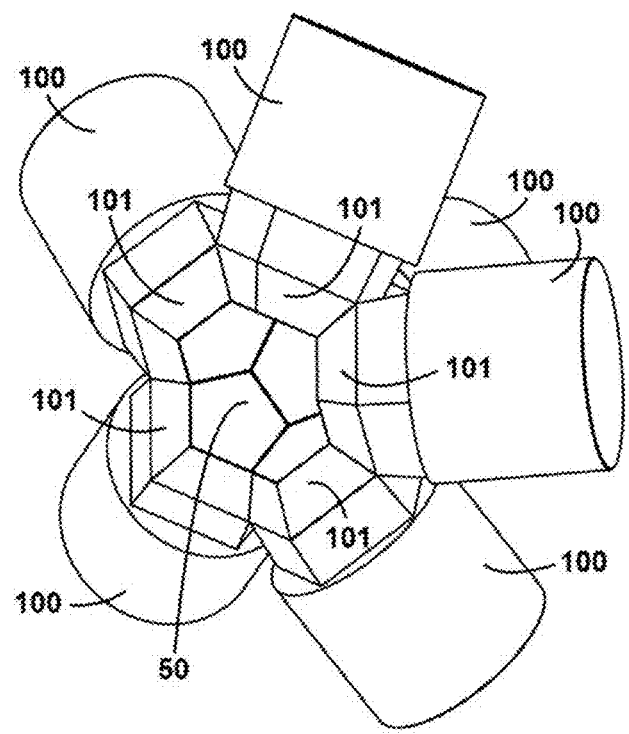
FIG. 20 shows an arrangement of 6 pentagonal shells (half a complete dodecahedral array of 12 shells for an N=12 detector) for locating FIG. 18 detectors about a dodecahedral radioxenon sample volume.

FIG. 20 shows a partial detector assembly consisting of 6 of these shells bonded together by attaching faces 101 on adjacent shells. The shells are quite thin, of order 0.003" (0.08 mm) and conform to the shape of both the stack of scintillators 95, 96 plus spacer 97 and the front end of the photodetector 98, providing only as much clearance as is required to cement those elements into place—typically about 0.010" (0.25 mm). The first surfaces on the shells, in particular, are tapered at the same angle as the faces of the scintillators so that, as discussed above, they will fill the space surrounding the sample cell 50.

The present shells were produced by electroforming, but the method of their manufacture is also not important to the invention method. The shells 100 can be attached by their faces 101 to form the detector structure using a variety of techniques including: optical epoxy, hot glue, or a low temperature brazing alloy applied between the faces. The only requirements are that: 1) the faces are strongly enough held to support the optical structures they contain; 2) that the meeting faces are completely sealed so that the resultant structure is gas tight; and 3) that the bonding material is kept as thin as possible to maximize the solid angles subtended by the sub-detector faces.

We do not address here the issue of introducing and extracting the gas samples into the sample cell volume, which may be solved in a variety of ways by any competent mechanical engineer. The detectors 95 and 96, spacer 97, and photodetector 98 can be sealed into the shells using any of various common optical cements. The major requirements here are that: 1) the seal between the shell and plastic scintillator 95 be gas tight; and 2) that the remaining seals should be made using a cement with a sufficiently low elastic modulus that no large stresses are generated between the different components when the assembly temperature changes.

6. Preferred Embodiment with N Equal to 6

Figure 21:
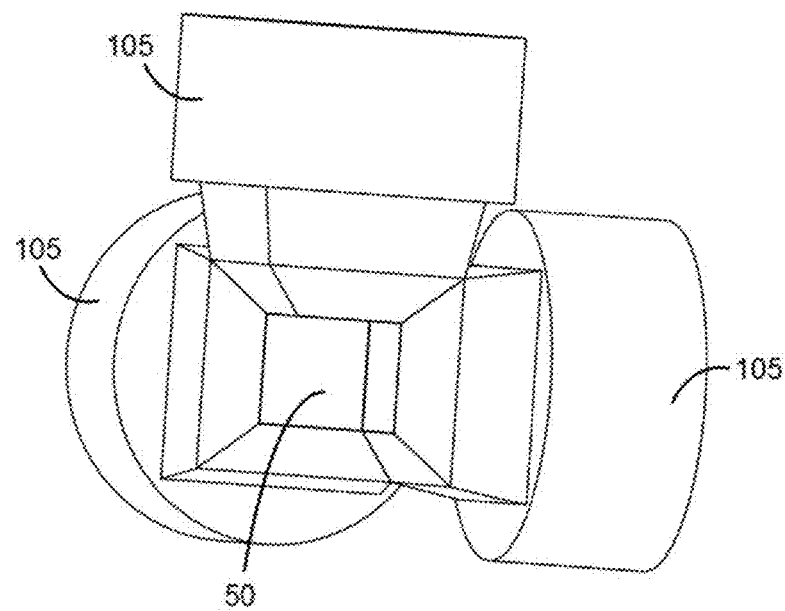
FIG. 21 shows an arrangement of 3 square shells (half a complete cubic array of 6 shells for an N=6 detector) for locating square cross section phoswich detectors about a cubic radioxenon sample volume.

A second preferred embodiment is shown in FIG. 21, where 3 shells 105 that are square in cross section are joined to form half of a detector with a cubical sample volume 50. The same general comments regarding the design and fabrication of the N=12 embodiment also apply here.

The difference between the two embodiments lies in the trade-off between cost and complexity on the one hand and performance on the other hand. The N=6 embodiment clearly has only half as many major components. On the downside, because it has fewer sub-detectors they are larger, meaning that their background counting rates will be larger. To further worsen the background situation, the ratio of same sub-detector (SD) plastic-crystal coincidences to different sub-detector (DD) plastic-crystal coincidences will be much larger, since this ratio scales as 1/N. Put another way, the number of "zero background" ROIs will be cut in half. Similarly, geometric partitioning will be less effective in reducing interferences. Since doubling the background requires a four-fold increase in signal counts to achieve the same standard deviation, the net result is that the N=6 implementation's minimum detectable concentrations (MDCs) are somewhat more than four times higher than those of the N=12 implementation. This may be a reasonable trade-off in situations, such as on-site inspections, where the reduced complexity and lower cost are more valuable than the added detectability.

7. Using a Scintillator as the Optical Coupler

In the discussion of Section 5 we discussed the use of an optical coupler 97 between the crystal scintillator 96 and photodetector 98. Also, in Section 3, we noted that the poorer MDC for $^{135g}Xe$, relative to the other radioxenon isotopes was primarily due to the low detection efficiency of the 6 mm crystal scintillator 96 for the 250 keV γ emitted by $^{135g}Xe$, particularly when it is made of NaI(Tl).

One method of improving the $^{135g}Xe$ MDC is to replace the passive coupler made, for example, of quartz or polycarbonate, with an active, high Z scintillator with a better cross section at 250 keV. The only requirement on this third scintillator is that its decay time be sufficiently different from those of the first two elements 95 and 96 so that the phoswich principle can still be used to accurately extract the energies of decay products that interact in them. As an example, if the first element 95 is BC404, with a decay time of about 20 ns, and the second element 96 is NaI(Tl) with a decay time of about 400 ns, then the active spacer 97 could be made of CsI(Tl) with a decay time of 1 μs. In this case all the decay times differ by factors of 2 or more, which is satisfactory for good phoswich operation. The analysis would proceed exactly as before with the addition of the possibility of double [β|γ] coincidences between the first plastic scintillator 95 and the third CsI(Tl) detector 97. Of course, if the second element 96 is made of CsI(Tl), then the coupler replacement should have a decay constant more in the range of NaI(Tl).

These active couplers could either have the same shape as the couplers they replace or, for increased efficiency, could be extended laterally to be bounded by the same planes that bound the first two detectors 95 and 96 (i.e., continue to be space filling). In this later case the optical coupling to the photodetector could be improved by the addition of a fourth optical element, another passive optical coupler, as will be clear to those skilled in the art.

Finally, as will also be apparent to those skilled in the art, this set of "active" spacers can also be employed as an "active veto" shield against cosmic radiation. Any coincidence, of any order, between one of these detectors and any other scintillator in the full system that does not deposit 250 keV in the coupler must be a background event and can be rejected because 250 keV is the only γ energy that can potentially be emitted by the sample. In particular, this makes it easy to reject events arising from minimum ionizing muons that drill through the whole detector, typically striking three or four sub-detector elements.

8. Operation as a Complete Detector System

Figure 22:
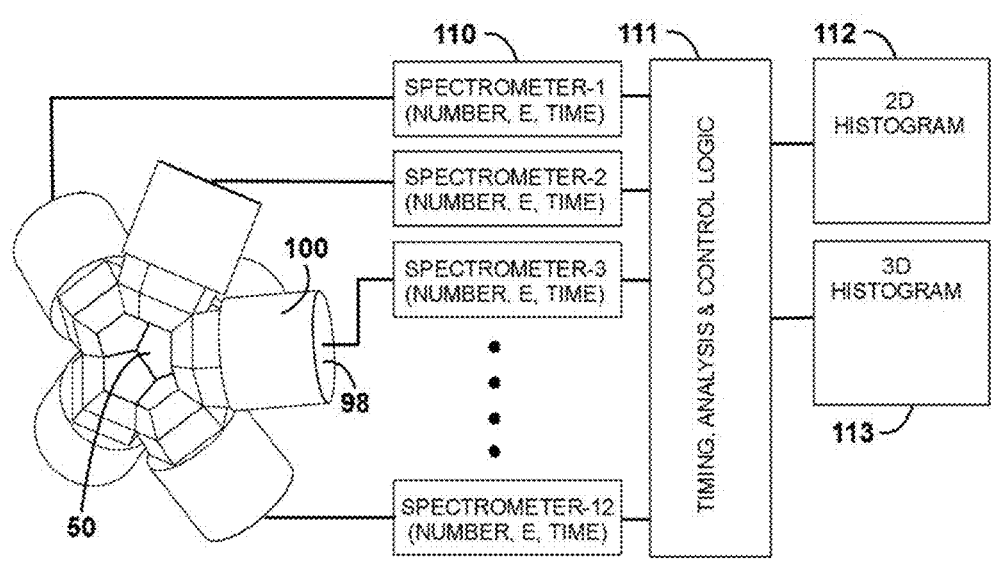
FIG. 22 shows a schematic of a detector system using the N=12 detector arrangement shown in FIG. 20.

In a preferred implementation, shown in FIG. 22, the N=12 detector is integrated into a complete detector system. From each sub-detector 100, the PMT 98 is attached to a channel of spectrometer electronics 110, there being N=12 such channels in all for this case. Each spectrometer analyzes the signal from its attached PMT, detects pulses in the signal, and analyzes detected pulses to determine if they were caused by one or more events within the detector. Using the methods known to the art for analyzing phoswich output pulses [WARBURTON—2006, HENNIG—2006], it measures the energies of the one or more events that produced each pulse and time stamps the results. It then passes the event energies and time stamp to the Timing, Analysis & Control Logic ("TACL") module 111. If desired, it can also send a logic pulse to the TACL whenever it detects a pulse. The TACL, using the time stamps or logic pulses to identify the occurrence of coincident events between sub-detectors. As noted above, coincidences can occur either within a single sub-detector or between different sub-detectors, so the TACL is designed to recognize and identify the different possible cases. For example, a triple coincidence could be produced by simultaneous events in sub-detectors 1, 4, and 6 or it could be produced by a double coincidence in sub-detector 1, simultaneously with an event in sub-detector 4.

First, consider a simple case, where we are only looking for (electron|photon) double coincidences and (electron|electron|photon) triple coincidences. In this case, as shown in FIG. 22, the TACL is connected to a single 2D histogram and a single 3D histogram. Then, whenever the TACL detects a double coincidence, it uses the measured electron and photon energies to place a point into the 2D histogram. Whenever the TACL detects a triple coincidence, it uses the two measured electron and one measured photon energies to place a point into the 3D histogram. The resultant histograms can then be used, as is known to the art and described earlier, to produce estimates of the concentrations of the various radioxenon isotopes of interest.

However, as discussed in Section 2.2, we have found that background are much lower for coincidences occurring in different detectors than for those within the same detector. Therefore, in our preferred embodiment we create and employ two 2D and two 3D histograms and place double coincidences that occur in the same sub-detector into the first 2D histogram and place double coincidences that occur in different sub-detectors into the second 2D histogram. Similarly, for the triple coincidences, cases where two of the three events share a detector are placed into the first 3D histogram, while the cases where all three events occur in different detectors are placed into the second 3D histogram.

Additional histograms can be added as well. If, for example, we want to identify (electron|electron) coincidences, we could set up a 2D histogram for that purpose. Or, if all the sub-detectors do not function equally well (having different energy resolutions, for example) it may be beneficial to create different histograms for events arising in different detectors or detector combinations.

9. Additional Detector System Embodiments

In Section 8 we presented a detector system that processed pulses and placed their energy values into histograms in real time. Other embodiments are possible and easily conceived by those skilled in the art. At one extreme, since the data rates are low, the spectrometers 110 could be replaced by waveform digitizers that, whenever they detect a pulse, capture its waveform and save it with a time stamp to memory. Then, at a later time, an off-line computer program can be used to parse the waveform file, analyze the captured pulses, extract the energies of the one or more events per pulse, and then examine the timestamps of the other waveforms in the file to detect coincidences between sub-detectors. Using this information it could then simply build the various 2D and 3D histograms discussed above. Thus, in this embodiment, only trace capture occurs in real time and all the other functions of the spectrometers 110 and TACL 111 are implemented in computer code off-line.

Intermediate cases are also possible. For example, the energy plus time stamp outputs of the spectrometers 110, rather than be passed to the TACL 111, could be recorded in a list mode data file which would then be read out and analyzed using an off-line computer program to sort the detected events into the desired histograms.

We therefore observe that, as an inventive step, the important point lies not in the details of how the PMT 98 signals are detected and analyzed to extract event energies. These methods are well known to those skilled in the art. Rather, the important point lies in placing detected double coincidences into one or more 2D histograms and placing detected triple coincidences into one or more 3D histograms so that the two classes of coincidences are analyzed separately to determine the radioxenon isotope concentrations.

10. References

The following references are incorporated by reference:
AXELSSON—2012: A. Axelsson et al., "Improvement of the SAUNA detector system calibration procedures," 2012 INGE Workshop (Mito City, Japan, 5-9 Nov. 2012).
BLÄCKBERG—2011: L. Blackberg et al., "Investigations of surface coatings to reduce memory effect in plastic scintillator detectors used for radioxenon detection," NIM A 656 (2011) 84-91. doi:10.1016/j.nima.2011.07.038.
COX—2011: C. Cox, et al. "Electron response in windowless Si(Li), SDD and PIN diode photodetectors," 2011 IEEE NSS/MIC Conf Record, pp. 2074-2080 (Valencia, Spain, 2011).
COOPER—2007: M. Cooper et al., "Redesigned beta/gamma radioxenon detector," Nuclear Instruments and Methods in Physics Research A, 509, 426-430 (2007).
COOPER—2012: M. Cooper et al., "Absolute calibration of a$\beta/\gamma$ Detector," INGE Workshop 2012 (Mito City, Japan, Nov. 5-9, 2012).
ELY—2012: J. H. Ely et al., "Technology goals for a next generation radioxenon monitoring system," 2012 Monitoring Research Review, pp. 586-593 (2012).
FRITIOFF—2014: T. Fritioff, "How to detect a nuclear explosion using a SAUNA" www.sysf. physto. se/instrumentation_seminars/presentations/110127_SAUNA.pdf.
HENNIG—2006: W. Hennig, H. Tan, W. K. Warburton, and J. I. McIntyre, "Single Channel Beta-Gamma Coincidence Detection of Radioactive Xenon Using Digital Pulse Shape Analysis of Phoswich Detector Signals"; IEEE Transactions on Nuclear Science 53, 620-624 (2006).
HENNIG—2009: W. Hennig et al., "Development of a Phoswich Detector System for Radioxenon Monitoring," J. Radioanalytical and Nuclear Chemistry, 282, 681-685 (2009).

HENNIG—2012: W. Hennig et al., "Radioxenon measurements with a coincidence silicon detector system," 2012 INGE Workshop (Mito City, Japan, 5-9 Nov. 2012).
LE-PETIT—2012: G. Le Petit, "New CE/photon spectrometer and sampling process developments for future SPALAX," 2012 INGE Workshop, (Mito City, Japan, 5-9 Nov. 2012).
MCINTYRE—2001: J. I. McIntyre et al., "Measurements of ambient radioxenon levels using the automated radioxenon sampler/analyzer (ARSA)," in J. Radioanalytical & Nuclear Chemistry, 248, No. 3, 629-635 (2001).
MCINTYRE—2004: J. I. McIntyre et al., "Triple coincidence radioxenon detector," 26th Seismic Research Review—Trends in Nuclear Explosion Monitoring, pp. 581-587 (2004).
MCINTYRE—2006: J. I. McIntyre et al., "Calculation of minimum detectable concentration levels of radioxenon isotopes using the PNNL ARSA system," PNNL Publication PNNL-13102 (2006).
REEDER—1998: P. L. Reeder, T. W. Bowyer, and R. W. Perkins, "Beta-gamma counting system for Xe fission products," in J. Radioanalytical & Nuclear Chemistry, 235, Nos. 1-2, 89-94 (1998).
REEDER—2004: P. L. Reeder, T. W. Bowyer, J. I. McIntyre, W. K. Pitts, A. Ringbom, and C. Johansson, "Gain calibration of $a\beta/\gamma$ coincidence spectrometer for automated radioxenon analysis" in Nuclear Instruments and Methods in Physics Research A521 586-599.
RYNES—2004: J. C. Rynes, D. Penn, and P. Donohoe, "Research and Development of Radioxenon Monitoring Systems," in 26th Seismic Research Review, #6-02, pp. 588-597 (2004); available online from the NNSA via the website https://www.nemre.nnsa/doe.gov and selecting "Research Reviews."
WARBURTON—2008: W. K. Warburton, H. Tan, and W. Hennig, U.S. Pat. No. 7,342,231, "Detection of Coincident Radiations in a Single Transducer by Pulse Shape Analysis."
WARBURTON—2012A: W. K. Warburton et al., "Alpha-A1203 Diffusion Barriers to Eliminate the Radioxenon Memory Effect in Phoswich Detectors," Monitoring Research Review 2012 (Albuquerque, N. Mex., 18-20 Sep. 2012).
WARBURTON—2012B: W. K. Warburton, "Replacing BC404 with stilbene—an approach to solving the radioxenon memory effect problem in ultra-low background $J^3/7$ counters," 2012 INGE Workshop (Mito City, Japan, 5-9 Nov. 2012).
XECON—no date: XECON—a tool for analysis of radioxenon data, available at xecon.sourceforge.net.

11. Conclusion

In the foregoing description of specific embodiments we have shown examples of a method and apparatus measure the concentrations of dilute radioxenon isotopes in a gaseous sample wherein the sample cell is surrounded by N sub-detectors that are sensitive to both energetic electrons, including betas and conversion electrons, and to energetic photons, including x-rays and gamma-rays. The sub-detectors are phoswich detectors consisting of a first detector element, such as a fast plastic scintillator, that is sensitive to the energetic electrons, a second detector element, such as a crystal scintillator like NaI(Tl), that is sensitive to the energetic photons.

Signal processing electronics are provided, typically subdivided into N channels of processing with each connected to one of the sub-detectors, where the electronics can detect events within the sub-detectors, measure their energies, determine whether they arise from electrons or photons, and detect coincidences between events, whether they are in the same or different sub-detectors. During a measurement, whenever a coincidence between two events is detected, their two measured energies are used to record a point in a two-dimensional histogram associated with the two event types (i.e., [electron|photon] or [electron1|electron2]) while, whenever a coincidence between three events is detected, their three measured energies are used to record a point in a three-dimensional histogram again associated with the three event types (i.e., [electron|photon1|photon2] or [electron1|electron2|photon]).

Regions of interest (ROIs) associated with the different decay branches of the several radioxenon isotopes of interest are established within both the two-dimensional and the three-dimensional histograms. After the measurement is completed, the number of coincidences in the ROIs are used to compute estimates of the concentrations of the several radioxenon isotopes in the sample. These techniques achieve lower backgrounds and lower minimum detectable concentrations by using smaller detector crystals, eliminating interference between double and triple coincidence decay branches, and segregating double coincidences within the same sub-detector from those occurring between different sub-detectors.

Thus, radioxenon detection limits are improved by providing a detector comprising a number N of sub-detectors so that there is a large chance that each of the several decay products produced by a decaying radioxenon nucleus will be absorbed in a separate sub-detector. This principle, called geometric partitioning, allows triple coincidences to be distinguished from double coincidences, analyzed separately, and so prevented from interfering with the detection of the double coincidences that solely characterize two of the radioxenon isotopes of interest. We further showed that subdividing the detector also leads to significantly reduced background counting rates in both double and triple coincidence ROIs. The result of these improvements is that, with the same size sample presently being used, we can cut counting times in half and still lower minimum detectable concentration (MDC) by factors of order 10.

While the presented embodiments are functional and effective, they were principally intended for purposes of illustration and description. Because the taught principles are general ones, the presentation was not intended to be exhaustive or to limit the invention to the precise forms described, and obviously, many modifications and variations are possible in light of the above teaching. Thus, these embodiments were chosen and described in order to best explain the principles of the invention and its practical application to thereby enable others in the art to best utilize the invention in various embodiments and with such modifications as best suit the invention to the particular uses contemplated.

Other forms, modifications, alternative constructions and equivalents can be used and the method can be applied to measurements in other areas than those described. As a first example, while our preferred embodiments employed phoswich detectors where the first element was sensitive to electrons and the second element to photons, this choice is based on currently available detector technology. If, in the future, a detector is developed that has a high efficiency and sensitivity to both electrons and photons, then it could be used to replace the phoswiches. As a second example, while shells were used to provide support for the detectors, it is clear that they could be replaced by a more complex assembly procedure that used only adhesive to hold the entire detector together.

While the above is a complete description of specific embodiments of the invention, the above description should not be taken as limiting the scope of the invention as defined by the claims.

What is claimed is:

1. A method for measuring the concentrations of multiple radioxenon isotopes in a gaseous sample of xenon, the method comprising:
   providing a detector comprising N sub-detectors surrounding a sample cell, wherein the N sub-detectors are sensitive to both electrons and photons from radioxenon decays, specifically including beta decays, conversion electrons, x-rays, and gamma-rays;
   providing signal processing electronics for the N sub-detectors that can detect both single and coincident events within a single sub-detector, detect coincident events between multiple sub-detectors, and measure the detected events' respective energies;
   introducing the sample of xenon into the sample cell;
   during a measurement interval,
      whenever a coincidence between two events is detected, recording the two events' two measured energies as a point in a two-dimensional histogram,
      whenever a coincidence between three events is detected, recording the three events' three measured energies as a point in a three-dimensional histogram, and
      establishing regions of interest (ROIs) within both the two-dimensional histogram and the three-dimensional histogram that correspond to decay paths of the multiple radioxenon isotopes to be measured; and
   after the measurement interval,
      computing estimates of the concentrations of the multiple radioxenon isotopes, based on the number of counts collected in each of the ROIs.

2. The method of claim 1 wherein the signal processing electronics comprise:
   N channels of processing electronics, each having a respective one of the N sub-detectors as its input; and
   a common module receiving outputs from the N channels of processing electronics;
   wherein,
      each channel can detect event pulses occurring within its sub-detector, and, for each detected pulse, measure the energies of the one or more events that produced the pulse, time stamp the measured results, and pass the event energies, the time stamp and/or a logic pulse to the common module, and
      the common module uses the time stamps and/or logic pulses to detect coincidences between multiple sub-detectors, and, whenever a coincidence is detected, uses the passed event energies to prepare pairs or triplets of measured energy values for use in recording the associated radioxenon decay in the two-dimensional or three-dimensional histogram.

3. The method of claim 1 wherein the signal processing electronics comprise:
   a computer; and
   N channels of processing electronics, each channel having a respective one of the N sub-detectors as its input, and comprising a pulse detector, an analog-to-digital converter (ADC), and local memory,
   wherein, when the pulse detector detects a pulse, the ADC:
      digitizes a portion of the signal containing the pulse,
      stores the resultant trace in a local memory with a time stamp, and
      notifies the computer; and
   wherein the computer, in response to being notified, runs an analysis program that,
      uses the traces and time stamps from the N channels to detect coincidences both within and between the N sub-detectors,
      extracts the event energies, and
      records the detected decays in the two-dimensional and three-dimensional histograms.

4. The method of claim 1 wherein the N sub-detectors are phoswich detectors and the signal processing electronics can detect coincidences occurring within the same sub-detector as well as coincidences occurring between different sub-detectors.

5. The method of claim 4 wherein a phoswich sub-detector comprises a first detector element that is sensitive to electrons and a second detector element that is sensitive to photons, coupled to each other and to a photodetector.

6. The method of claim 5 wherein the first detector element is a first fast plastic scintillator and the second detector element is a first inorganic crystal scintillator.

7. The method of claim 5 where the photodetector is a photomultiplier.

8. The method of claim 5 where the signal processing electronics, by distinguishing between events occurring in the first detector element and those occurring in the second detector element, can distinguish between electron and photon events occurring in the phoswich sub-detector.

9. The method of claim 8 wherein multiple two-dimensional and three-dimensional histograms are employed and coincidences are sorted into them according to the event types that the coincidences contain.

10. The method of claim 9 where the histograms include [photon|electron] and [electron1|electron2] two-dimensional histograms and [photon|electron1|electron2] and [photon1|photon2|electron] three-dimensional histograms.

11. The method of claim 8 wherein the signal processing electronics attached to a phoswich sub-detector apply pulse shape analysis to its output signals to determine whether a detected event was generated by an electron, by a photon, or by an electron and a photon in coincidence.

12. The method of claim 6 where an optical element is used to provide coupling between the second detector element and the photodetector in order to provide clearance space for the latter in the volume surrounding the fully assembled set of N sub-detectors.

13. The method of claim 12 where the optical element is constructed of a second inorganic crystal scintillator whose decay constant differs from the decay constants of both the first fast plastic scintillator and the first inorganic crystal scintillator by a factor of 5 or more.

14. The method of claim 13 where, in order to increase the phoswich sub-detector's detection efficiency for higher energy gamma-rays, the second inorganic crystal scintillator has a higher density than the first inorganic crystal scintillator.

15. The method of claim 13 where signals detected from the second inorganic crystal scintillator are used in an active veto system to reduce the detector's background due to cosmic rays.

16. The method of claim 1 wherein:
   when a double coincidence is detected in different sub-detectors, the energies of the two events are used to record a point in a first two-dimensional histogram;

when a double coincidence is detected in the same sub-detector, the energies of the two events are used to record a point in a second two-dimensional histogram; and each of the first and second two-dimensional histograms has its own ROIs and the counts within these ROIs contribute separately toward the estimates of the concentrations of the multiple radioxenon isotopes.

17. The method of claim 1 wherein the sample cell is formed by joining together the N sub-detectors.

18. The method of claim 1 wherein additional ROIs are used to estimate background counting rates in the ROIs that correspond to the decay paths of the multiple radioxenon isotopes to be measured.

19. A method for measuring the concentrations of multiple radioxenon isotopes in a gaseous sample of xenon, the method comprising:
providing a detector comprising N sub-detectors surrounding a sample cell, wherein the N sub-detectors are sensitive to both electrons and photons from radioxenon decays, specifically including beta decays, conversion electrons, x-rays, and gamma-rays;
providing a plurality of waveform digitizers for the N sub-detectors;
introducing the sample of xenon into the sample cell;
in response to detecting pulses from the N sub-detectors,
digitizing the waveforms of the detected pulses from the N sub-detectors; and
storing the digitized waveforms into a data file, along with an indication of which sub-detector produced each waveform, and a time stamp for each waveform; and
at a later time, processing the digitized waveforms in the data file by,
analyzing the digitized waveforms of the detected pulses,
extracting the energies of one or more events per pulse,
examining the timestamps of the other digitized waveforms in the data file to detect coincidences between sub-detectors,
whenever a coincidence between two events is detected, recording the two events' two measured energies as a point in a two-dimensional histogram,
whenever a coincidence between three events is detected, recording the three events' three measured energies as a point in a three-dimensional histogram, and
establishing regions of interest (ROIs) within both the two-dimensional histogram and the three-dimensional histogram that correspond to decay paths of the multiple radioxenon isotopes to be measured, and
computing estimates of the concentrations of the multiple radioxenon isotopes, based on the number of counts collected in each of the ROIs.

20. An apparatus for measuring the concentrations of multiple radioxenon isotopes in a gaseous sample of xenon, the apparatus comprising:
a detector comprising N sub-detectors surrounding a sample cell, wherein the N sub-detectors are sensitive to both electrons and photons from radioxenon decays, specifically including beta decays, conversion electrons, x-rays, and gamma-rays; and
signal processing electronics for the N sub-detectors, the signal processing electronics configured to:
detect both single and coincident events within a single sub-detector,
detect coincident events between multiple sub-detectors, and
measure the detected events' respective energies;
during the measurement of the sample of xenon in the sample cell,
whenever a coincidence between two events is detected, record the two events' two measured energies as a point in a two-dimensional histogram, and
whenever a coincidence between three events is detected, record the three events' three measured energies as a point in a three-dimensional histogram, and
after the measurement is completed,
determine the number of counts within a set of regions of interest (ROIs) established within both the two-dimensional histogram and the three-dimensional histogram that correspond to decay paths of the multiple radioxenon isotopes to be measured, and
use the number of counts so determined to estimate the concentrations of the multiple radioxenon isotopes within the sample cell.

21. The apparatus of claim 20 wherein the signal processing electronics comprises:
N channels of processing electronics, each having a respective one of the N sub-detectors as its input; and
a common module receiving outputs from the N channels of processing electronics;
wherein,
each channel can detect event pulses occurring within its sub-detector, and, for each detected pulse, measure the energies of the one or more events that produced the pulse, time stamp the measured results, and pass the event energies, the time stamp and/or a logic pulse to the common module, and
the common module uses the time stamps and/or logic pulses to detect coincidences between multiple sub-detectors, and, whenever a coincidence is detected, uses the passed event energies to prepare pairs or triplets of measured energy values for use in recording the associated radioxenon decay in the two-dimensional or three-dimensional histogram.

22. The apparatus of claim 20 wherein the signal processing electronics comprises:
a computer; and
N channels of processing electronics, each channel having a respective one of the N sub-detectors as its input, and comprising a pulse detector, an analog-to-digital converter (ADC), and local memory,
wherein, when the pulse detector detects a pulse, the ADC:
digitizes a portion of the signal containing the pulse,
stores a resultant trace in the local memory with a time stamp, and
notifies the computer; and
the computer, in response to being notified, runs an analysis program that,
uses the traces and time stamps from the N channels to detect coincidences both within and between the N sub-detectors,
extracts the event's energies, and
records the detected decays in the two-dimensional and three-dimensional histograms.

23. The apparatus of claim 20 wherein:
the N sub-detectors are phoswich detectors;
each phoswich detector comprises a first detector element that is sensitive to electrons and a second detector element that is sensitive to photons, the first detector element and the second detector element coupled to each other and to a photodetector; and
the signal processing electronics can detect coincidences occurring within the same sub-detector as well as coincidences occurring between different sub-detectors.

24. The apparatus of claim 23 wherein the first detector element is a fast plastic scintillator and the second detector element is an inorganic crystal scintillator.

25. The apparatus of claim 23, and further comprising an optical element that provides coupling between the second detector element and the photodetector.

26. The apparatus of claim 25 wherein the optical element is a second inorganic crystal scintillator detector element that is used either to increase the sub-detector's detection efficiency for higher energy gamma-rays, or as part of an active veto system to reduce background in the detector from cosmic rays, or both.

* * * * *